United States Patent
Maibach, Jr.

(10) Patent No.: US 10,751,638 B2
(45) Date of Patent: *Aug. 25, 2020

(54) HIGH EFFICIENCY DISTILLATION HEAD AND METHODS OF USE

(71) Applicant: Lab Society LLC, Boulder, CO (US)

(72) Inventor: Michael S. Maibach, Jr., Frederick, CO (US)

(73) Assignee: LAB SOCIETY LLC, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/188,271

(22) Filed: Nov. 12, 2018

(65) Prior Publication Data

US 2019/0076752 A1    Mar. 14, 2019

Related U.S. Application Data

(63) Continuation-in-part of application No. 16/103,321, filed on Aug. 14, 2018, now Pat. No. 10,406,451, which is a continuation-in-part of application No. 29/614,928, filed on Aug. 24, 2017, now Pat. No. Des. 828,904, application No. 16/188,271, which is a continuation-in-part of application No. 29/634,400, filed on Jan. 22, 2018, now Pat. No. Des. 855,754, and a continuation-in-part of application No. 29/614,926, filed on Aug. 24, 2017, now Pat. No. Des. 862,640, and a continuation-in-part of application No. 29/595,937, filed on Mar. 3, 2017, (Continued)

(51) Int. Cl.
    *B01D 3/32*     (2006.01)
    *B01D 5/00*     (2006.01)
    *B01D 3/02*     (2006.01)

(52) U.S. Cl.
    CPC ................. *B01D 3/32* (2013.01); *B01D 3/02* (2013.01); *B01D 5/0003* (2013.01); *B01D 5/006* (2013.01); *B01D 5/0087* (2013.01)

(58) Field of Classification Search
    CPC ................................. B01D 3/16; B01D 5/006
    See application file for complete search history.

(56) References Cited

U.S. PATENT DOCUMENTS

| | | | | |
|---|---|---|---|---|
| 2,427,142 A | * | 9/1947 | Hornbacher | G01N 25/145 165/11.1 |
| 2,468,872 A | * | 5/1949 | Goldsbarry | B01D 3/4205 202/185.1 |

(Continued)

FOREIGN PATENT DOCUMENTS

| | | |
|---|---|---|
| CN | 2702775 Y | 6/2005 |
| CN | 201079707 Y | 7/2008 |

(Continued)

*Primary Examiner* — Jonathan Miller
(74) *Attorney, Agent, or Firm* — Greenspoon Marder LLP; Justin F. McNaughton

(57) ABSTRACT

A high efficiency distillation head and methods of use has a distillation head that may be used for efficient fractional distillation of high boiling point compounds, and includes a lower insulated jacket surrounding a fractionating column and an upper insulated jacket surrounding a condenser. An exit path of equal or greater cross sectional area to the fractionating column is located at or below the top of the fractionating column.

23 Claims, 40 Drawing Sheets

Related U.S. Application Data now Pat. No. Des. 852,928, and a continuation-in-part of application No. 29/595,939, filed on Mar. 3, 2017, now Pat. No. Des. 877,856.

(60) Provisional application No. 62/580,032, filed on Nov. 1, 2017, provisional application No. 62/759,987, filed on Nov. 12, 2018, provisional application No. 62/670,020, filed on Nov. 12, 2018.

(56) References Cited

U.S. PATENT DOCUMENTS

| | | | | |
|---|---|---|---|---|
| 3,340,157 | A * | 9/1967 | Weiss | B01D 1/0017 202/176 |
| 3,393,133 | A * | 7/1968 | Baird | B01D 3/12 159/13.1 |
| 3,395,083 | A * | 7/1968 | Gilmont | B01L 3/569 202/177 |
| 3,607,662 | A * | 9/1971 | Glover | B01D 3/14 202/160 |
| 3,907,683 | A * | 9/1975 | Gilmont | B01B 1/08 202/177 |
| 4,471,836 | A * | 9/1984 | Hokanson | F28B 9/10 165/111 |
| 5,164,049 | A * | 11/1992 | Clark | B01D 1/02 134/12 |
| 5,354,428 | A * | 10/1994 | Clark | B01D 1/02 159/DIG. 19 |
| 5,885,313 | A * | 3/1999 | Okamoto | B01D 3/085 165/110 |
| 6,419,796 | B1 * | 7/2002 | Kitamura | B01D 3/14 202/153 |
| 6,551,464 | B1 | 4/2003 | Kimel | |
| 6,596,129 | B1 * | 7/2003 | Yoneda | B01D 3/14 203/2 |
| 7,267,746 | B1 | 9/2007 | Harris et al. | |
| 8,414,744 | B2 | 4/2013 | Heydrich et al. | |
| 9,040,730 | B2 | 5/2015 | Liang et al. | |
| 9,138,657 | B1 | 9/2015 | Wiederin et al. | |
| 9,340,475 | B2 | 5/2016 | Mona, III et al. | |
| D775,310 | S | 12/2016 | Kremerman | |
| D776,238 | S | 1/2017 | Kremerman | |
| D788,316 | S | 5/2017 | Kremerman | |
| 9,649,349 | B1 | 5/2017 | Tucker et al. | |
| D790,033 | S | 6/2017 | Kremerman | |
| 9,682,331 | B2 * | 6/2017 | Kremerman | B01D 3/10 |
| D802,084 | S | 11/2017 | Kremerman | |
| D802,085 | S | 11/2017 | Kremerman | |
| D805,599 | S | 11/2017 | Kremerman | |
| D805,600 | S | 12/2017 | Kremerman | |
| D806,829 | S | 1/2018 | Kremerman | |
| 9,895,626 | B2 * | 2/2018 | Kremerman | B01D 3/26 |
| 9,895,627 | B2 | 2/2018 | Kremerman | |
| 9,956,501 | B2 | 5/2018 | Balass | |
| D819,779 | S | 6/2018 | Kremerman | |
| 10,029,188 | B2 | 7/2018 | Kremerman | |
| 10,159,907 | B2 | 12/2018 | Kremerman | |
| 10,406,451 | B2 * | 9/2019 | Maibach | B01D 3/02 |
| 2015/0136158 | A1 * | 5/2015 | Stevens | A24F 47/008 131/329 |
| 2017/0003264 | A1 * | 1/2017 | Adams | G01N 33/2823 |
| 2018/0065060 | A1 * | 3/2018 | Wells | B01D 3/12 |
| 2018/0078874 | A1 | 3/2018 | Russel | |
| 2018/0140965 | A1 | 5/2018 | Flora et al. | |
| 2018/0282250 | A1 | 10/2018 | Rutz et al. | |
| 2018/0290074 | A1 | 10/2018 | Kremerman | |

FOREIGN PATENT DOCUMENTS

| | | |
|---|---|---|
| CN | 202823431 U | 3/2013 |
| CN | 103623880 B | 8/2015 |
| CN | 105606423 A | 5/2016 |
| CN | 205287678 U | 6/2016 |
| CN | 205598689 U | 9/2016 |
| CN | 207877682 U | 9/2018 |
| EP | 2294931 A1 | 3/2011 |

* cited by examiner

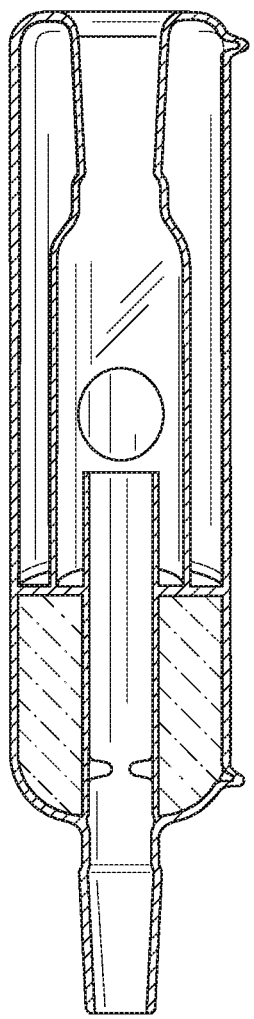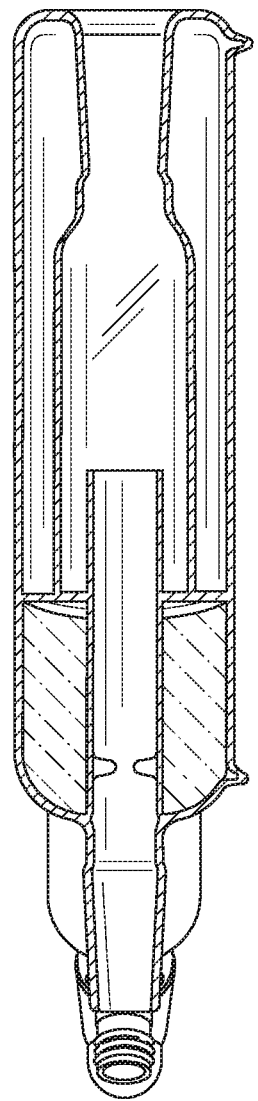
FIG. 33
FIG. 34

HIGH EFFICIENCY DISTILLATION HEAD AND METHODS OF USE

CROSS-REFERENCE TO RELATED APPLICATIONS

The present application is Continuation in part of U.S. Non-Provisional application Ser. No. 16/103,321, filed Aug. 14, 2018, which claims priority benefit of U.S. Design patent application No. 29/614,928, filed Aug. 24, 2017, and claims the priority benefit of U.S. Provisional Application No. 62/580,032, filed Nov. 1, 2017. The application further claims priority benefit of U.S. Design patent application No. 29/595,939 filed Mar. 3, 2017, U.S. Design patent application No. 29/595,937 filed Mar. 3, 2017, U.S. Design patent application No. 29/614,926, filed Aug. 24, 2017, U.S. Design patent application No. 29/634,400, filed Jan. 22, 2018, U.S. Provisional Application No. 62/759,987, filed Nov. 12, 2018, and U.S. Provisional Application No. 62/760,020, also filed Nov. 12, 2018, the contents of which are incorporated herein by reference.

BACKGROUND OF THE INVENTION

This disclosure relates to the general field of distillation, and more specifically toward a high efficiency distillation head and methods of use. The distillation head may be used for efficient fractional distillation of high boiling point compounds, and includes a lower insulated chamber (i.e., a jacket or a vacuum jacket) surrounding or wrapped around a fractionating column (also called a path, inner tube, fractionating column, or fractionating tube) and an upper insulated chamber (i.e., a jacket or vacuum jacket) surrounding a condenser. The lower insulated chamber may also feature a vacuum chamber having silvering (mirroring) inside of the vacuum chamber to increase thermal and infrared heat retention in the fractionating column within the lower insulated chamber, while leaving the upper insulated chamber un-silvered (not mirrored) to allow for a temperature differential between the condenser in the upper chamber and the fractionating column in the lower chamber for improved (more efficient) condensation of fractionated vapors. An exit path, having a cross sectional area that is greater than or substantially equal to the cross section of the fractionating column, is located vertically within the distillation head at or below the top of the fractionating column.

Distillation systems, specifically fractional distillation systems, separate mixtures into their component parts, or fractions, by heating the mixtures to a temperature that causes one or more fractions to vaporize. The heated vapors ascend through a fractionating column, some of which condense and revaporize along a temperature gradient. In existing systems, vapor exits through a small exit hole or restriction in the column for condensation as the vapor passes out of the fractionating column. However, the small exit hole slows throughput and provides a small condensation surface area for collecting the distillate.

Current designs also utilize a coolant jacket for the upper condenser portion, in addition to a long or extended fractionating column that extends into the upper condenser. Such a design is not ideal because utilizing coolant rather than a vacuum chamber requires at least one additional mechanical accessory (and creates additional complexity), and it also decreases the efficiency of the distillation head. The longer the fractionating column in these designs, the more energy required to force the vapors to exit the top of the condenser (because there is no direct insulation around the fractionating column).

Thus there has existed a long-felt need for an improved, efficient distillation head and fractionating column to distill compounds, including high boiling point compounds, while minimizing the use of heat, energy, and/or coolant. One of the benefits of the present high efficiency design is that the fractionating column is shortened and the lower insulated chamber has greatly increased thermal retention; thus, the disclosed device requires significantly less heat to allow fractionated vapors to exit the shortened column to the upper condenser.

SUMMARY OF THE INVENTION

The current invention provides a high efficiency distillation head and methods of use. The distillation head may be used for efficient fractional distillation of high boiling point compounds, and includes a lower insulated chamber surrounding a fractionating column and an upper insulated chamber surrounding a condenser. An exit path having a cross sectional area that is equal to or greater than the cross sectional area of the fractionating column is located on the distillation head at or below the top of the fractionating column. The lower insulated chamber can also feature a vacuum chamber having silvering (mirroring) inside of the vacuum chamber (i.e., vacuum jacket) to increase thermal and infrared heat retention, while leaving the upper insulated chamber un-silvered (not mirrored), which allows for a greater temperature differential and greater condensation efficiency of fractionated vapors.

A distillation head according to selected embodiments may be used in conjunction with a vacuum system and heated boiling flask (with product inside) to fractionate and separate high boiling point compounds. The device can be used, for example, to separate cannabinoids, from other constituents found in cannabis oils or constituents from other herbs. The fractionating column is engineered to promote separation while keeping the fractionating column short enough to keep the energy required below a certain threshold and maintaining the compound in its vapor phase. In one embodiment, the threshold is 175° C. In one embodiment, the threshold is 180° C. In another embodiment, the threshold is 190° C. In one embodiment, the threshold is 200° C. In another embodiment, the threshold is between about 175° C. and about 210° C. This works by employing two insulated chambers, a lower insulated chamber and an upper insulated chamber. The lower insulated chamber is hotter because it is heated by the vapor in the fractionating column and the upper insulated chamber is cooler to promote condensation of vapors exiting the fractionating column. A feature of this design compared to others is that the fractionating column exits to a larger condenser thereby resulting in much higher condensation (flow) rates in the head. Another feature of this design compared to others is that both the lower and upper insulation chambers feature vacuum chambers (i.e., vacuum jackets), with the lower insulated vacuum chamber having the option of silvering (mirroring). Utilizing this dual-chamber design, the distillation head can maintain a temperature differential between the lower vacuum chamber (fractionating) and the upper vacuum chamber (condensing) without the use of coolants, heaters, or chillers. Essentially, anything exiting the fractionating column has the ability to condense—unlike in previous designs where purified vapors had to exit a restriction area or small hole/opening and enter a secondary condenser. The improvement in efficiency due to a larger exit hole (less hold up or restriction) and larger condensation surface area, is a significant improvement over previously produced distillation heads/columns.

It is an object of the disclosure to provide an efficient distillation head and fractionating column to distill compounds, including high boiling point compounds.

It is another object of the disclosure to provide a distillation head and fractionating column to distill high boiling point compounds.

It is a further object of this disclosure to provide a method of efficiently distilling high boiling point compounds.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise. As used herein the term "substantially equal to" refers to within ten percent of the value.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

There has thus been outlined, rather broadly, the more important features of the disclosure in order that the detailed description thereof may be better understood, and in order that the present contribution to the art may be better appreciated. There are additional features of the disclosure that will be described hereinafter and which will also form the subject matter of the claims appended hereto. The features listed herein and other features, aspects and advantages of the present disclosure will become better understood with reference to the following description and appended claims.

BRIEF DESCRIPTION OF DRAWINGS

The accompanying drawings, which are incorporated in and form a part of this specification, illustrate embodiments of the disclosure and together with the description, serve to explain the principles of this invention.

FIG. 33 is a front cutaway view of a distillation head according to selected embodiments of the current disclosure.

FIG. 34 is a rear cutaway view of a distillation head according to selected embodiments of the current disclosure.

DETAILED DESCRIPTION OF THE PREFERRED EMBODIMENT(S)

Figure 1:
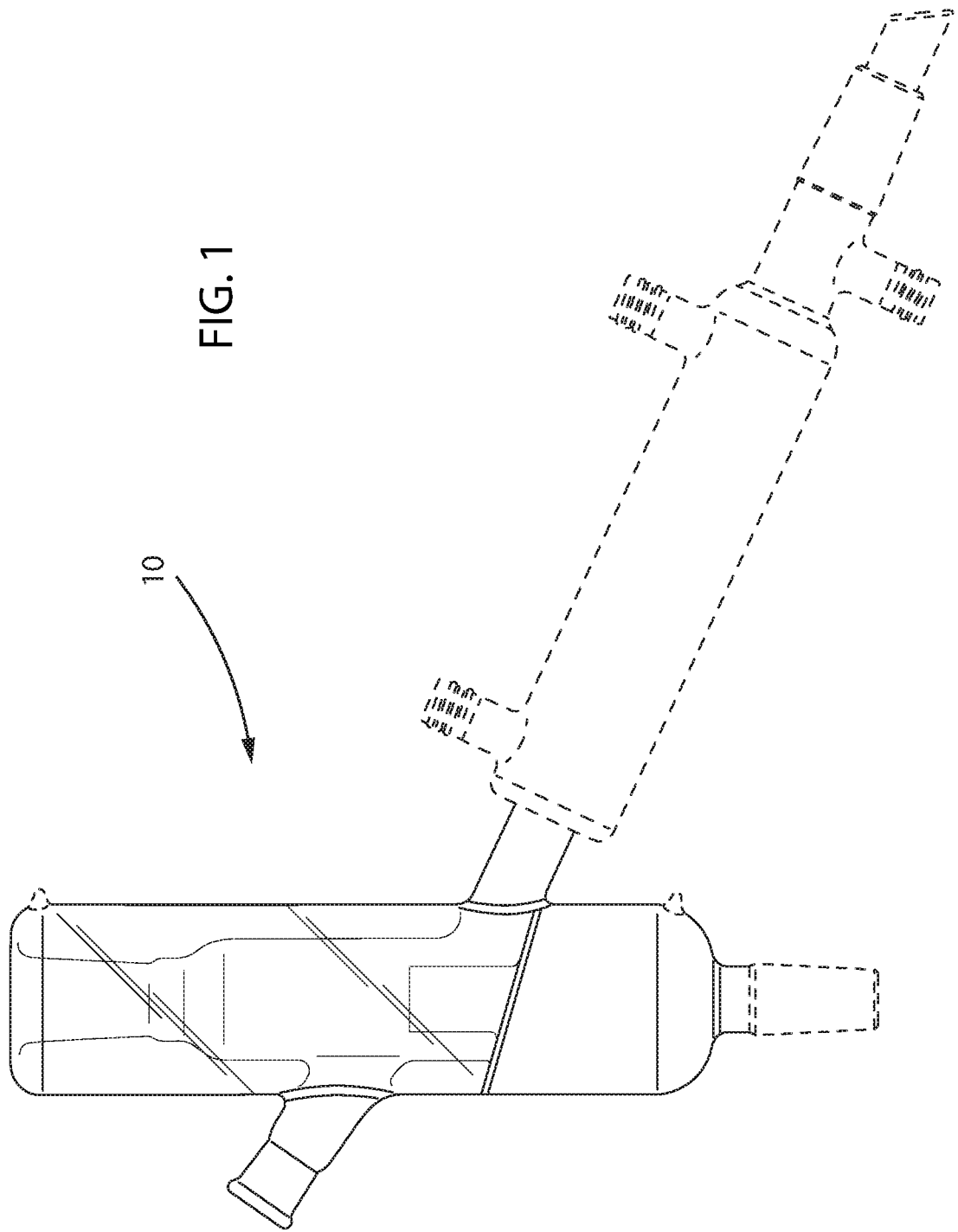
FIG. 1 is a right side elevational view of a distillation head according to selected embodiments of the current disclosure.
Figure 2:
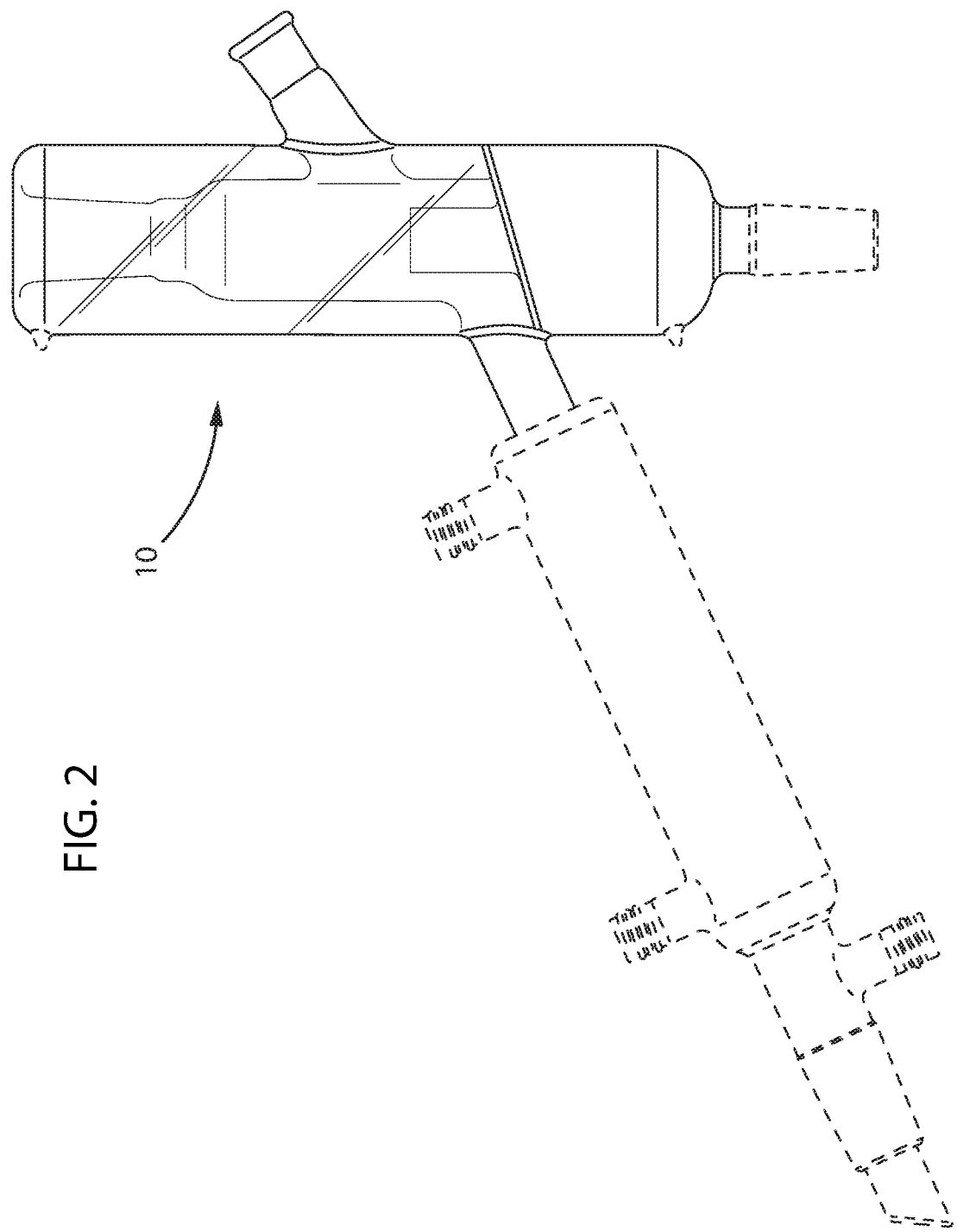
FIG. 2 is a left side elevational view of a distillation head according to selected embodiments of the current disclosure.
Figure 3:
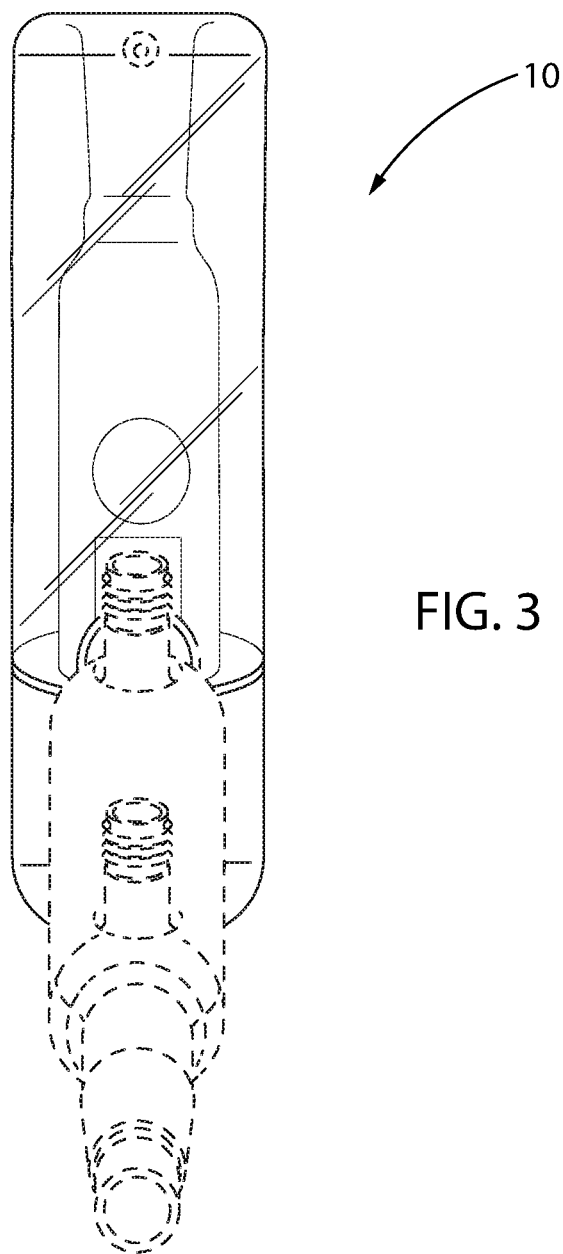
FIG. 3 is a front elevational view of a distillation head according to selected embodiments of the current disclosure.
Figure 4:
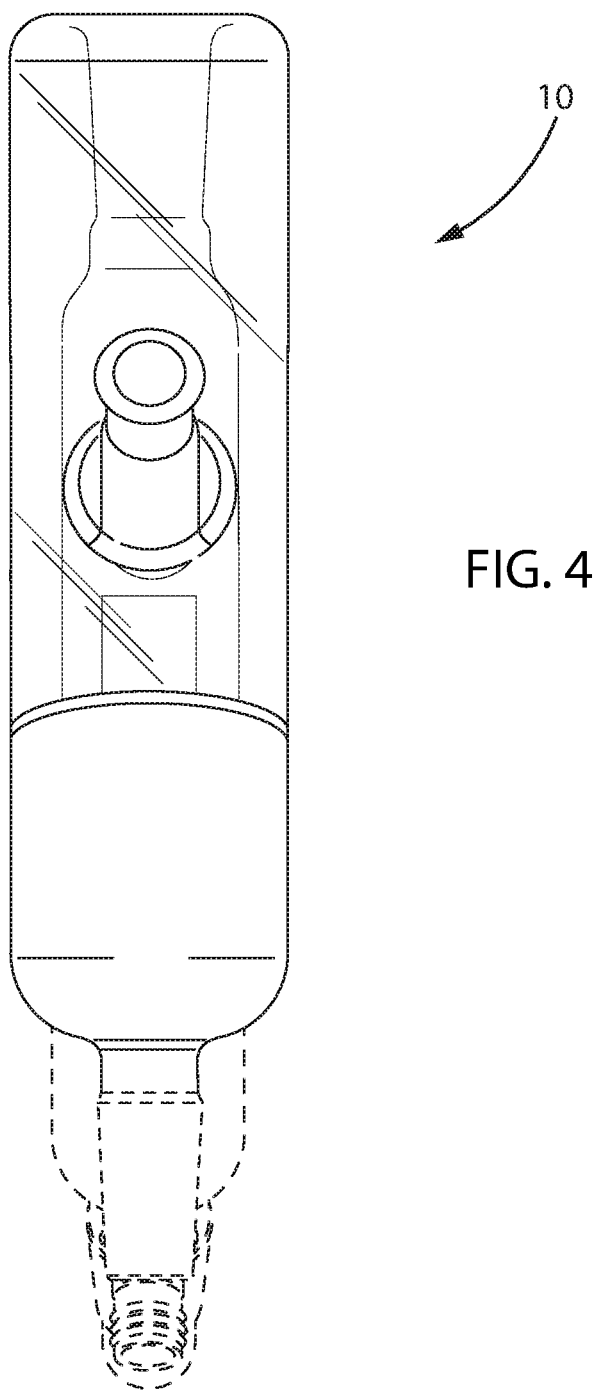
FIG. 4 is a rear elevational view of a distillation head according to selected embodiments of the current disclosure.
Figure 5:
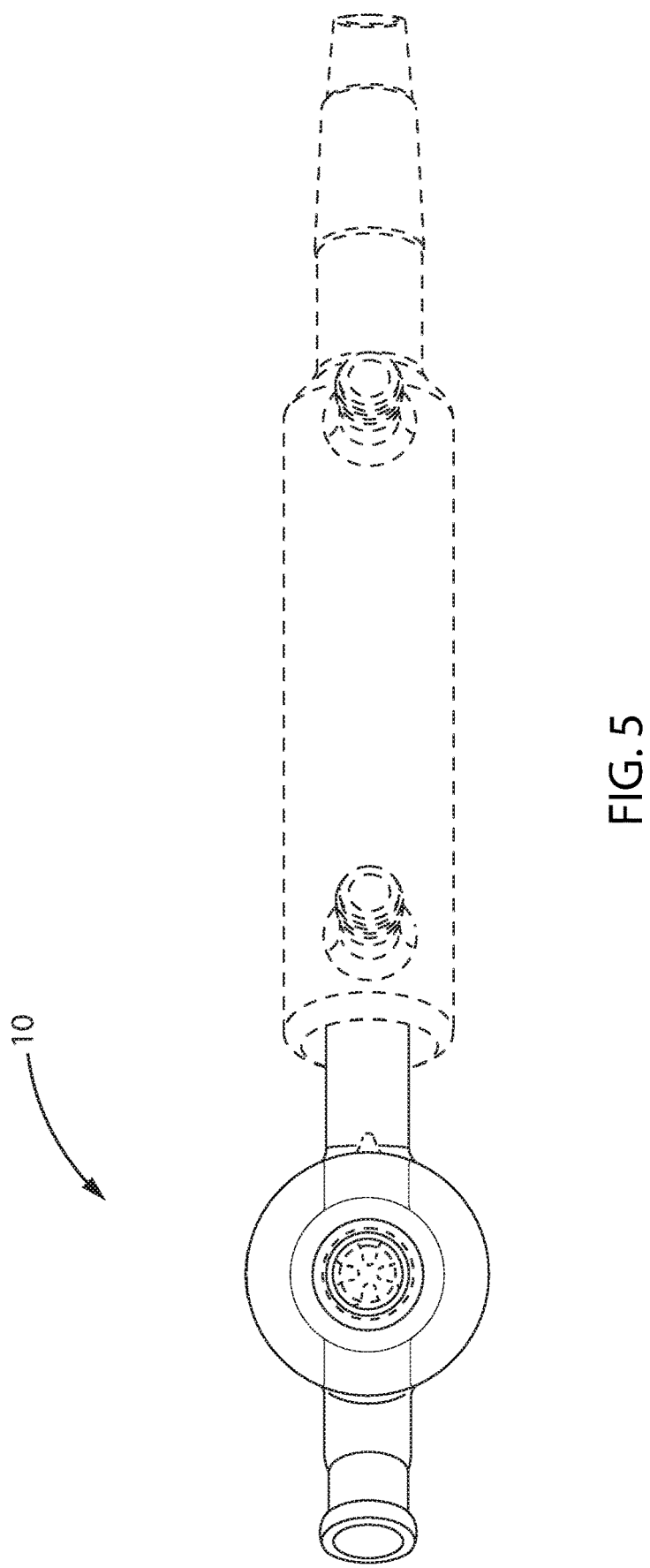
FIG. 5 is top elevational view of a distillation head according to selected embodiments of the current disclosure.
Figure 6:
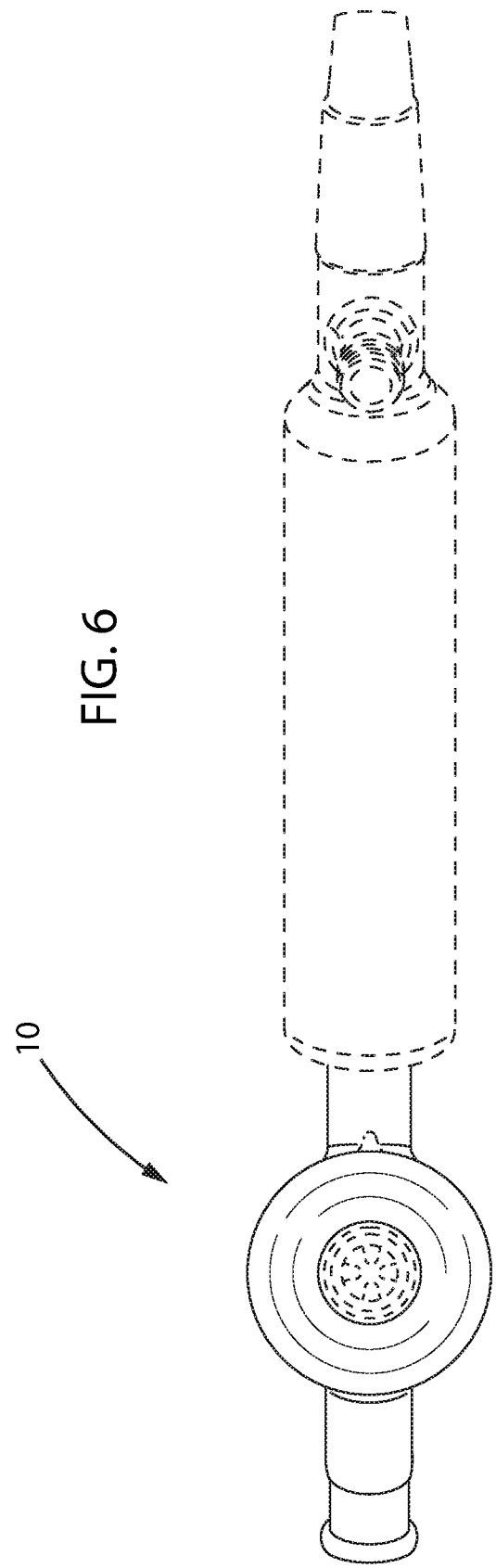
FIG. 6 is a bottom elevational view of a distillation head according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

The distillation head is made up of two main parts: the lower insulated chamber surrounding the fractionating column and the upper insulated chamber surrounding the condenser. The device has heat insulation surrounding the fractionating column, which may be filled with an array of packing materials or structured packings to increase surface area for fractionation. In one embodiment the packing materials are glass beads or any other objects suitable for use in a distillation head that increase the surface area. Once heated by vapor passing through it, the lower insulated chamber contains heat within the fractionating column that begins to fractionate vaporized compounds as they rise through the fractionating column, interacting with pockets of liquids on the surface of the fractionating column/packing. Once the vapors reach the top of the lower insulated chamber, they quickly begin to cool as they exit the fractionating column, which fractionating column has an opening at least as wide as the diameter or cross-section of the exit. In some embodiments, the diameter or cross-section of the exit is wider than the diameter of the fractionating column. In some embodiments, as discussed below, the diameter or cross section of the exit is less than the diameter of the fractionating column.

Because in some embodiments, the fractionating column has a similar or smaller cross sectional area to the vapor outlet (exit), the low-hold up design allows for maximum vapor throughput and condensation on the outer walls of the upper insulated chamber. The larger surface area of the inner "dome" of the condenser (i.e., the upper jacket which is vacuum insulated) condenses purified vapors into liquids after they have exited the fractionating column. These condensed vapors, now liquids, flow down towards the sloped bottom of the condenser towards the exit. In some embodiments, the exit port has the same inner diameter or cross-sectional area as the fractionating column which allows for maximum vacuum flow without restricting the overall flow rate (or to maintain flow rate when there is material inserted in the fractionating column that reduces the flow rate in the fractionating column). Other embodiments provide for an exit port that has a larger diameter or cross-sectional area than the fractionating column. Some embodiments have an exit port with a smaller diameter or cross sectional area than the exit port to change flow rates.

The fractionating column is relatively short and, in some embodiments, does not extend into the condenser. In other embodiments, it extends into the condenser but not so much that it disrupts the condenser's efficiency. Utilizing silvering inside of the walls of the lower insulated chamber (for infrared heat retention) greatly improves the efficiency of this design. In one embodiment, the lower insulated chamber is a vacuum chamber and the silvering is applied while it is unsealed (open at bottom) before it is sealed. In one embodiment, the silvering is a Silver Nitrate spray coating (usually applied leaving a viewing strip for the fractionating column). The silvering can be any reflective material that reflects infrared radiation, whether its actual color is silver, gold, bronze, rose gold, or any other color. Once the silvering is applied, the lower insulated chamber (i.e., vacuum jacket) is sealed with the silver nitrate coating its interior walls. The silvering of the lower insulated chamber reflects and traps infrared radiation, or long wave electromagnetic radiation which would otherwise escape through the glass. The visible thermal improvements from adding silvering are easily viewable via thermal imaging cameras (FLIR cameras) that detect long wave infrared; when measuring the surface temperatures of the portions of the device with silvering, they appear significantly cooler at high temperatures.

The silvering on the lower insulated chamber coupled with an un-silvered upper insulated chamber creates an increased temperature differential from the hot lower vacuum chamber to the cool upper insulated chamber thereby causing rapid condensation and increases the maximum throughputs of main fractions (the primary constituent being extracted).

In traditional distillation heads, the flow rates for a 24/40 condenser are between about 100 to 200 g/hr and for a 24/40 condenser. The flow rates for a 34/45 distillation head are generally between about 250-500 g/hr.

| Size Distillation Head | Output Range of Traditional Distillation Head | Output Range of Disclosed Distillation Head |
| --- | --- | --- |
| 24/40 Distillation Head | 100-200 g/hour | 250-500 g/hour |
| 34/45 Distillation Head | 250-500 g/hour | 350-1000 g/hour |

In one embodiment, the throughput rate of the currently disclosed fractionating column and distillation head is 30% to 300% greater than traditional distillation heads. In one embodiment, the currently disclosed distillation head is larger than existing traditional distillation heads and has a throughput above 1000 g/hour. In one embodiment, the temperature differential between the lower insulation chamber 22 and the upper insulation chamber 31 of the device is between about 5 and 30° C.

FIGS. 1-6 show various views of a distillation head 10 according to selected embodiments of the current disclosure.

Figure 7:
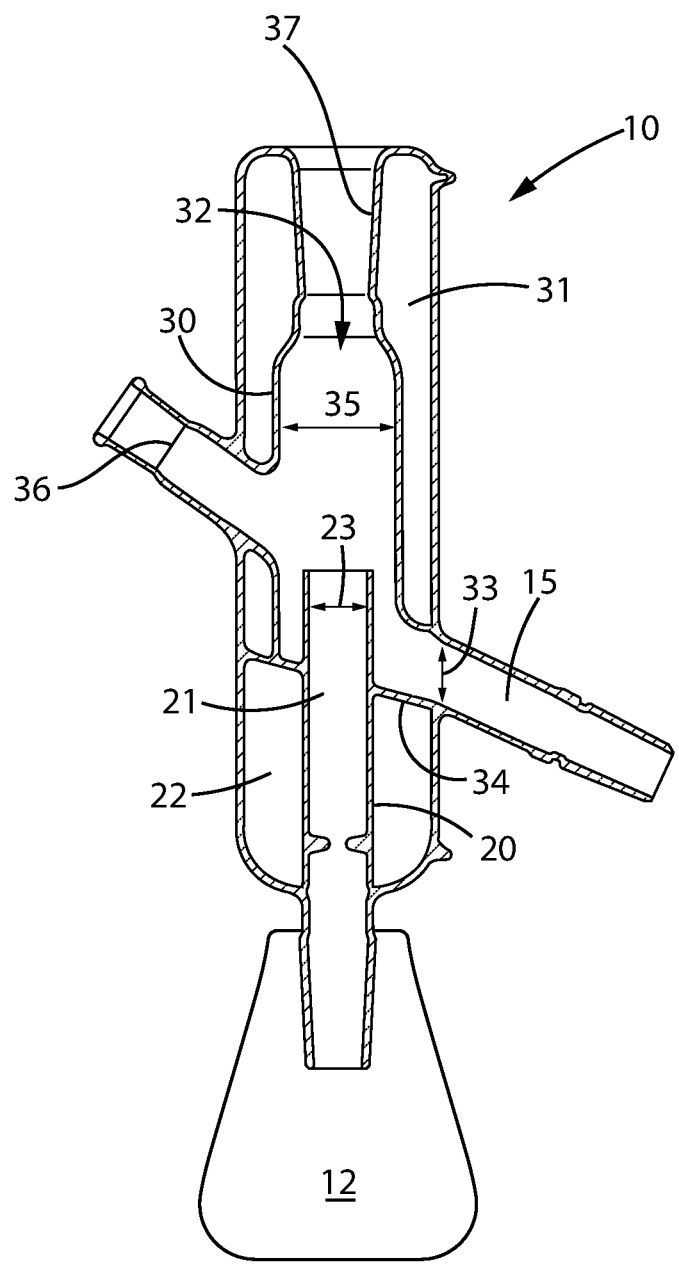
FIG. 7 is a right side cutaway view of a distillation head according to selected embodiments of the current disclosure.

FIG. 7 is a right side cutaway of the same embodiment shown in FIGS. 1 to 6 of a distillation head 10 according to selected embodiments of the current disclosure. The distillation head 10 includes a fractionating column 21 surrounded by a lower insulation chamber (i.e., a lower jacket) 22. In certain embodiments, the inner wall 20 of the lower insulation chamber 22 is silvered to help retain infrared heat. In one embodiment, the lower insulation chamber 22 surrounds, encircles, wraps around or fits around fractionating column 21 to further retain heat within the fractionating column 21. Certain embodiments of the current disclosure have a lower vacuum insulating chamber 22, wherein the chamber is devoid or substantially devoid of matter. Alternative embodiments provide for a chamber that is filled with insulating material or insulated, for example using vacuum jackets, double vacuum jackets, inert gas, physical insulation, heating oil jacket, liquid jackets, fiberglass, electric heater sleeve, or any other form of insulation. The fractionating column 21 has an inner diameter 23 that, in the embodiment shown in this figure, is substantially constant along its vertical length. Nonetheless, projections, protrusions, packing, or other elements may extend from the inner surface of the fractionating column or reside within the fractionating column 21 to increase surface area for fractionation. In some embodiments, the distillation head 10 has an optional upper joint 37. In some embodiments, the distillation head 10 has an optional side joint 36.

Vapors are supplied to the fractionating column 21 by a contained source, for example, a heated boiling flask 12, though other sources of vapors are contemplated by the current disclosure, including those that provide a continuous feed of vapors. Vapors exit the column 21 to enter into the condenser 32.

In some embodiments, the condenser 32 has an upper jacket 31. In certain embodiments, the upper jacket is non-silvered to increase infrared heat transfer out of the condenser to help maintain cooler temperatures inside the condenser 32. In some embodiments, an upper insulation chamber 31 surrounds, encircles, wraps around or fits around the condenser 32. Certain embodiments of the current disclosure have an upper vacuum insulating chamber 31, wherein the chamber is devoid or substantially devoid of matter. Alternative embodiments provide for an upper insulating chamber 31 that is filled with insulating material or insulated, for example, using vacuum jackets, double vacuum jackets, inert gas, physical insulation, heating oil jackets, liquid jackets, fiberglass, or any other form of insulation.

In some embodiments (not shown), the condenser has no upper jacket surrounding it, but only a single glass wall, while the lower end of the fractionating column has a lower, silvered jacket, which can further differentiate the temperature within the fractionating column compared to the uninsulated condenser. In other embodiments, the condenser has no upper jacket surrounding it and the condenser has no lower jacket, but the outer walls of the fractionating column are silvered, which can further differentiate the temperature within the silvered fractionating column compared to the uninsulated, unsilvered condenser. In some embodiments, the condenser has an upper jacket surrounding it, while the lower end of the fractionating column has no lower jacket, but only a single glass, silvered wall, which can differentiate the temperature within the silvered fractionating column compared to the insulated condenser.

In one embodiment, the fractionating column 21 extends upwards and into the condenser 32 through a floor 34 of the condenser 32. The condenser 32 has an inner diameter 35 that is greater than the inner diameter 23 of the fractionating column 21. Additionally, the condenser 32 can have a cross sectional area that is greater than the cross sectional area of the fractionating column 21.

The floor 34 of the condenser 32 slopes downwards towards an exit or distillate port 15 allowing for the exit of distillate out of the chamber of the condenser 32. The distillate port 15 has a diameter 33. In certain embodiments, the diameter 33 of the distillate port 15 is equal to or substantially equal to the diameter 23 of the fractionating column 21. In other embodiments, the diameter 33 of the distillate port 15 is greater than the diameter 23 of the fractionating column 21. Alternatively (or in addition to), the openings of the distillate port 15 and the fractionating column 21 may be defined by a cross sectional area, in which case the cross sectional area of the distillate port 15 is equal to or substantially equal to the cross sectional area 23 of the fractionating column 21. Accordingly, in alternative embodiments, the cross sectional area 33 of the distillate port 15 is greater than the cross sectional area 23 of the fractionating column 21 and in other embodiments, the cross sectional area 33 of the distillate port 15 is the same as or smaller than the cross sectional area 23 of the fractionating column 21.

The distillate port 15 is located at the lowest point of the sloped floor 34 so that condensate flows by gravity to the distillate port 15 down the sloped floor 34. Moreover, in this embodiment, the distillate port 15 is located below the exit or top of the fractionating column 21.

Figure 45:
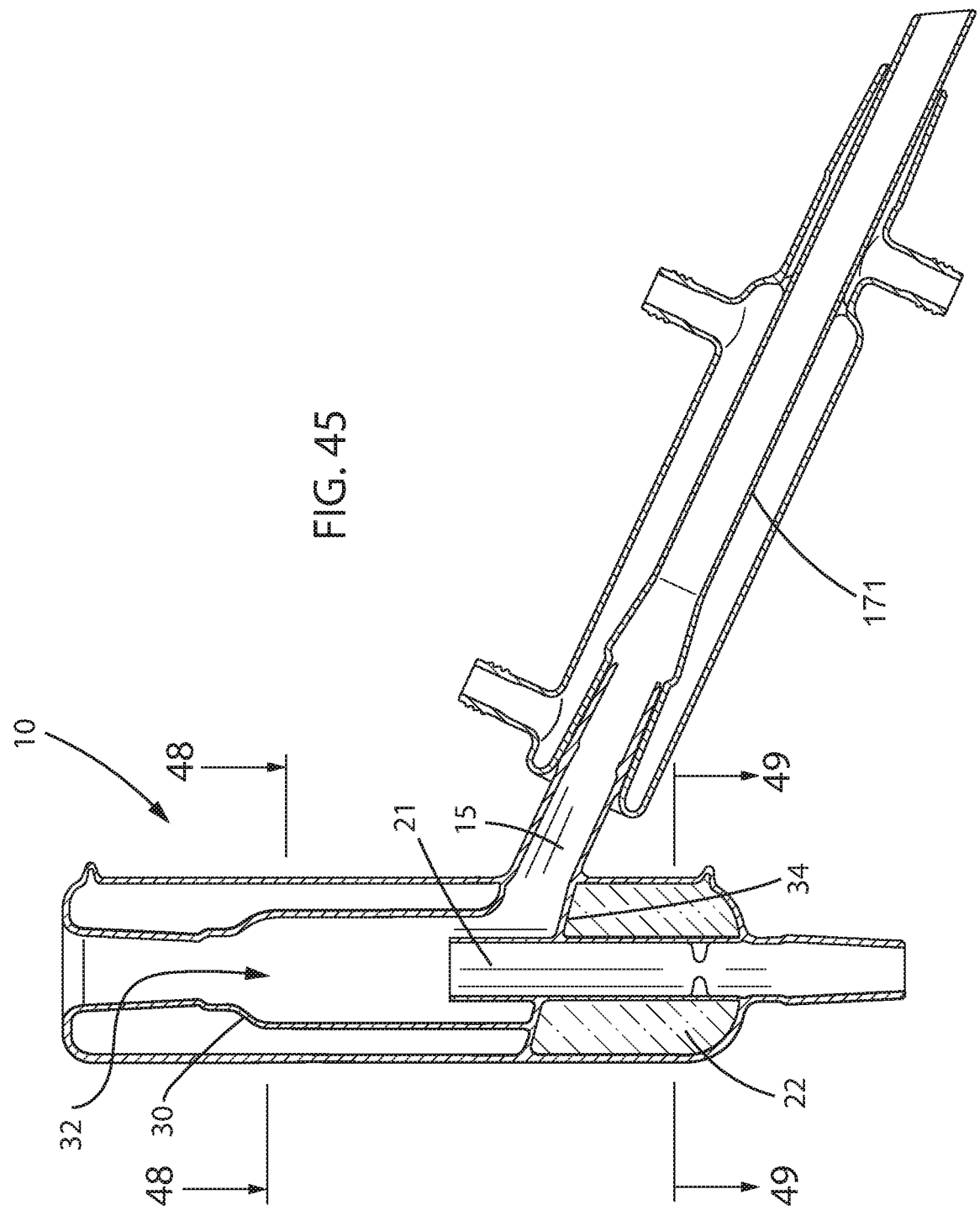
FIG. 45 is a right side cutaway view of a distillation head according to selected embodiments of the current disclosure.
Figure 46:
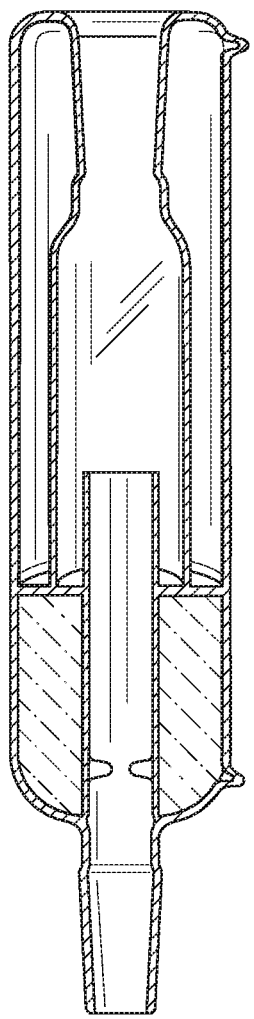
FIG. 46 is a front cutaway view of a distillation head according to selected embodiments of the current disclosure.
Figure 47:
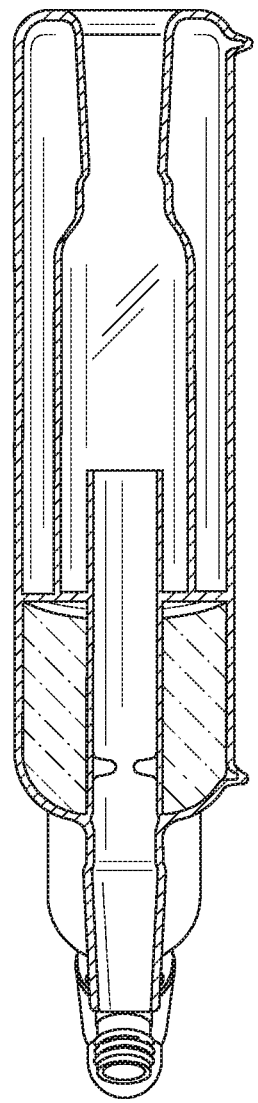
FIG. 47 is a rear cutaway view of a distillation head according to selected embodiments of the current disclosure.
Figure 48:
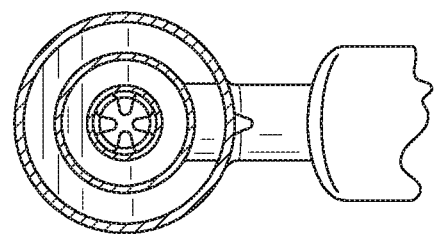
FIG. 48 is a bottom cutaway view of a distillation head according to selected embodiments of the current disclosure.
Figure 49:
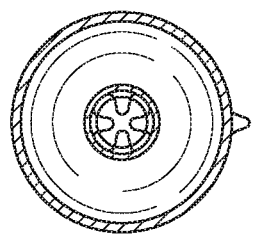
FIG. 49 is a top cutaway view of a distillation head according to selected embodiments of the current disclosure.

In one embodiment, a secondary condenser (171 in FIGS. 26 and 45) provides additional surface area, temperature change, and pressure change to condense additional liquid from the heated vapor. In one embodiment, the secondary condenser 171 is also an insulated chamber with a vacuum jacket, double vacuum jacket, inert gas, physical insulation, heating oil jacket, liquid jacket, fiberglass, electric heater sleeve, or any other form of insulation. In this way, the secondary condenser 171 can be hotter or colder than the primary condenser 32, creating a secondary reaction to encourage even greater condensation rates. In one particular embodiment, the secondary condenser 171 is wrapped in an insulated sleeve (not shown) that further comprises its own electric heating element (i.e., resistance heater), which electric heating element heats the secondary condenser 171 while the insulated sleeve retains the heat inside the secondary condenser 171. In one embodiment, the secondary condenser 171 has a housing or an outer surface and the insulated sleeve wraps around the entire housing or outer surface except for its entry and exit ports and pulloffs. This insulated sleeve retains heat along the entire length of the secondary condenser. In some embodiments, less than the entire length of the secondary condenser 171 is covered. In one embodiment, an electric resistance heater is located in the sleeve because it is relatively inexpensive to operate and maintain compared to oil and water jackets. Instead of a liquid jacket with inlet/outlet ports for the secondary condenser, one embodiment can have a simple glass tube with about an ⅛ inch trough to fit a thermocouple (bent) in between the glass and the hot mantle jacket. The heat can be maintained and monitored by a temperature controller. In some embodiments, the sleeve is wrapped around a secondary condenser 171 also having a vacuum jacket or other jacket. In other embodiments, the sleeve is wrapped around a glass tube. In embodiments with multiple jackets, the jackets can be used together to improve the efficiency of the design. In other embodiments, an insulated sleeve is wrapped around a secondary condenser having a single glass wall so that the electric heater is in close proximity with the secondary condenser chamber to improve control over the temperature inside the secondary condenser chamber. In one embodiment, the secondary chamber is surrounded by a vacuum jacket which has a silver lining or is silvered similar to the primary condenser also of the present disclosure described above. In one embodiment, the insulated sleeve is filled with fiberglass or some other insulating material so that it retains heat from the electric mantle. In one embodiment, the sleeve is about 11 inches long and about 5 inches in diameter. In other embodiments, the sleeve is between about 8 inches long and 15 inches long. In other embodiments, the sleeve's diameter is between about 3 inches and 7 inches. In some embodiments, the sleeves can be braided from nylon, polypropylene, polyester, Nomex®, Kevlar®, Spectra®. In some embodiments, the sleeve can be stuffed, layered or filled with fiberglass, polyethylene foam insulation or any other material that will retain heat inside the secondary condenser. In one embodiment, the sleeve has an insulated flap on at least one side that can be opened for viewing the reaction inside the secondary condenser. The insulated flap can be held in the closed position using Velcro or other fasteners so that the flap's insulation is held against the secondary condenser when not opened for viewing. In one embodiment, one end of the sleeve can be flat so that it can sit close to the outer wall of the primary distillation head. The other end can be slightly elongated on either the top or the bottom so that it can cover slightly more or less on the top than the bottom on that end of the sleeve. In such an embodiment, the sleeve can taper or form a curve from the shorter side to the longer side. In one embodiment, the insulation and the sleeve's cover can be woven. Other than the flap, the left side of the sleeve can look the same as the right side of the sleeve. Other than the changes caused by the profile of the elongated end, the ends can look the same from an elevational view. Other than the insulated flap, both side cutaway views of the sleeve can look the same. In one embodiment, the insulated sleeve is removable, and fastens to itself around a secondary condenser 171 with Velcro tabs or other fasteners. When the insulated sleeve is removed, it can be spread out flat forming a rough rectangular shape, having silver or other colored outer covering on one side and a white or colored insulation on the other side. Both the inside and the outside can be woven fiberglass. In some embodiments, the outside is another material so that it does not irritate a person's skin when handling the sleeve. In the embodiment shown, one end of the flattened insulated sleeve can have an elongated section that tapers out from both sides (discussed above to provide additional coverage over a knuckle or joint on one side but not the other of a condenser or glass tube). In one embodiment, the elongated section extends 1½ inches longer than the rest of the end. The insulation can be between about half inch to 3 inches thick, and in one embodiment the insulated sleeve fits around a 1⅛ inch diameter tube. In another embodiment, the insulated sleeve fits around a tube that is between about half inch and 2½ inches in diameter. In one embodiment, the insulated sleeve 172 is about 12½ inches long at its shortest point and 14 inches long at its longest point. In one embodiment, the heating mantle is a standard 115V, 150 W mantle.

Turning now to the method, to distill a compound, heat is applied to the compound underneath the distillation head 10 causing at least some portion of it to vaporize. The resulting vapors enter the fractionating column 21 of the distillation head 10 for fractionation. The fractionating column 21 bounded by the lower insulation chamber (i.e., lower jacket) 22 fractionates compounds as they rise in vapor form through the fractionating column 21, interacting with pockets of liquids on the surface of the fractionating column 21 and any packing therein. Highly distilled vapors flow up and out of the fractionating column 21 and into the condenser 32. The vapors condense within the condenser 32 to form a liquid, which flows downwards along the walls of the condenser 32 towards the floor 34, and then down the sloped floor 34 to the distillation port 15 or exit. The method allows distillation at greater rates, in part, because of the drop in pressure caused as the gas leaves the fractionating column 21 and enter the greater volume of space in the condenser 21.

In one embodiment, the present disclosure comprises a method of distilling a compound comprising the steps of: supplying a vapor from a contained source to a distillation head, where the distillation head comprises: (i) a column with a surrounding insulation chamber, the column having an inner diameter; (ii) a condenser with a surrounding insulation chamber, the condenser having an inner diameter and a floor; and (iii) a distillation port, the distillation port having an inner diameter; (iv) wherein the column extends through the floor of the condenser, the floor of the condenser slopes downward towards the distillation port, the inner diameter of the distillation port is substantially equal to or greater than the inner diameter of the column, and the inner diameter of the condenser is greater than the inner diameter of the column; condensing the vapor to a liquid in the condenser; and collecting liquid from the distillation port. The contained source can be a boiling flask, a flask or vessel with an oil jacket or electric mantels, a flask or vessel heated by steam, or any other heated vessel. The insulation chamber around the column can be a vacuum chamber. The insulation chamber around the condenser can also be a vacuum chamber. The distillation head can comprise a silver lining on the insulation chamber around the fractionating column, wherein the silver lining reflects infrared radiation, preventing it from escaping the insulation chamber around the column. The silvering increases the efficiency and allows distillation at much lower temperatures than previous devices, in some embodiments, resulting in efficiency increases of 10-35% over existing distillation heads. The vapor can be supplied to the distillation head through the column. The method can further comprise the step of maintaining a temperature differential of between about 5° and 30° Celsius between the condenser and the column. The contained source can be a boiling flask attached to the distillation head.

In one alternative of the method, when the condensed liquid leaves the distillate port 15 of the distillation head 10, the method comprises the additional step of passing the liquid (and remaining vapor) through a secondary condenser 171 where the liquid and gas are reheated using an electric mantle surrounded by an insulated sleeve described above. This additional, optional step creates a secondary reaction in which the products of the first distillation head are reheated and catalyzes additional fractionation and distillation.

Figure 8:
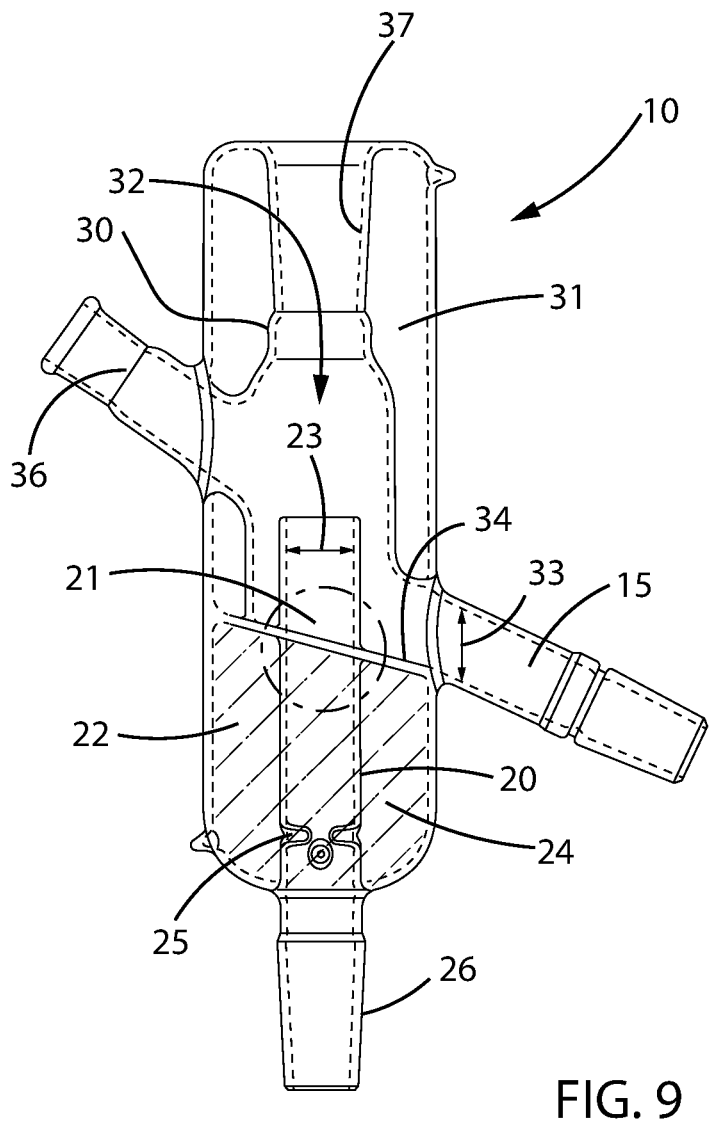
FIG. 8 is side view of another embodiment of a distillation head, showing the shortened upper condenser, a shortened fractionating column, and silvering on the lower insulated chamber.

Turning now to additional physical embodiments, in some embodiments, shown in FIG. 8, one or two inlet ports 36, 37 may pierce through the upper vacuum jacket to provide the ability for packing insertion into fractionating column 21, which can, optionally, have Vigreux indents 25 (i.e., packing retainer indents or indents) to support packing at bottom of column 21, increase the surface area, and increase the turbulence inside the fractionating column 21. The inlet ports may also be used for temperature/pressure sensing via a thermocouple or thermometer immersed into the column to obtain vapor temperature measurements of compounds exiting column 21. These inlet ports 36, 37 are not required for operation, but do allow for additional data collection and/or modularity of the optional packing material.

Figure 9:
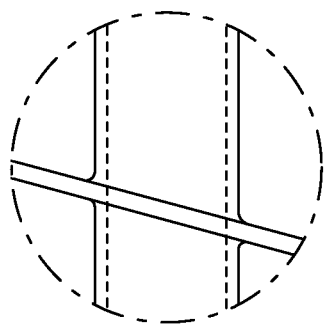
FIG. 9 is a close up of the embodiment of a distillation head from FIG. 8, showing detail of the column passing through the floor of the condenser.
Figure 10:
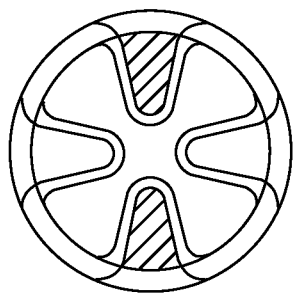
FIG. 10 is a top close up view of the interior of the embodiment of a distillation head from FIG. 8, showing detail of the restriction in the column.

In one embodiment, shown at FIG. 8, the distillation head 10 is a cylinder that is approximately 262 mm long from a top end to a bottom end and has an outer diameter of 64 mm. In one embodiment, the diameter of the interior of the condenser 32 is 19 mm. In one embodiment, the inner diameter of the column 21 is 18.4 mm. In one embodiment, the inner diameter of the distillation port 15 is 18.4 mm. In one embodiment, the fractionating column 21 extends about 30 mm above the floor 34 of the condenser 32 and about 74 mm below the floor 34 of the condenser 32, where it connects to a joint 26 that can add about 55 mm to the length of the fractionating column 21. In one embodiment, the floor 34 is angled at a 75° angle from the vertical fractionating column 21 (i.e., 15° downward from horizontal). In one embodiment, the distillation port 15 continues out of the condenser 32 from the floor 34 at approximately a 62° angle from the vertical. In one embodiment, the distillation port 15 extends about 85 mm (including the joint) from the exterior of the condenser 32. In one embodiment, the optional inlet port 36 is positioned at a 55° angle from the vertical fractionating column 21 and extends about 55 mm, including the joint, from the exterior of the condenser 32. In one embodiment, as shown in FIG. 9, the interior walls of the fractionating column 21 are straight as the column 21 passes through the floor 34. In one embodiment, as shown in FIGS. 8 and 10, the fractionating column 21 has a restriction area 25 in the bottom half of the column 21 that is formed by four indents positioned around the interior of the column, each at about 90° apart from the next. In one embodiment, two of the indents are on one vertical plane and two of the indents are on another vertical plane, separated, in one embodiment, by approximately 5 mm. In one embodiment, the restriction area is about 15 mm above the bottom of the lower insulation chamber 22. In one embodiment, the restriction area is used to support additional packing material (not shown) when inserted in the column 21. In one embodiment, the condenser 32 is about 136 mm long at its center, extending from the floor 34 to the top of the distillation head 10. In one embodiment, the distillation head 10 is about 207 mm from the top of the exterior of the upper insulation chamber 31 to the bottom of the exterior of the lower of the lower insulation chamber 22. In one example, a joint 26 at the bottom of the column 21 extends about 55 mm from the end of the lower insulation chamber 22. In one embodiment, the silver lining 24 coats or covers the interior walls of the lower insulation chamber 22 located below the floor 34.

Figure 11:
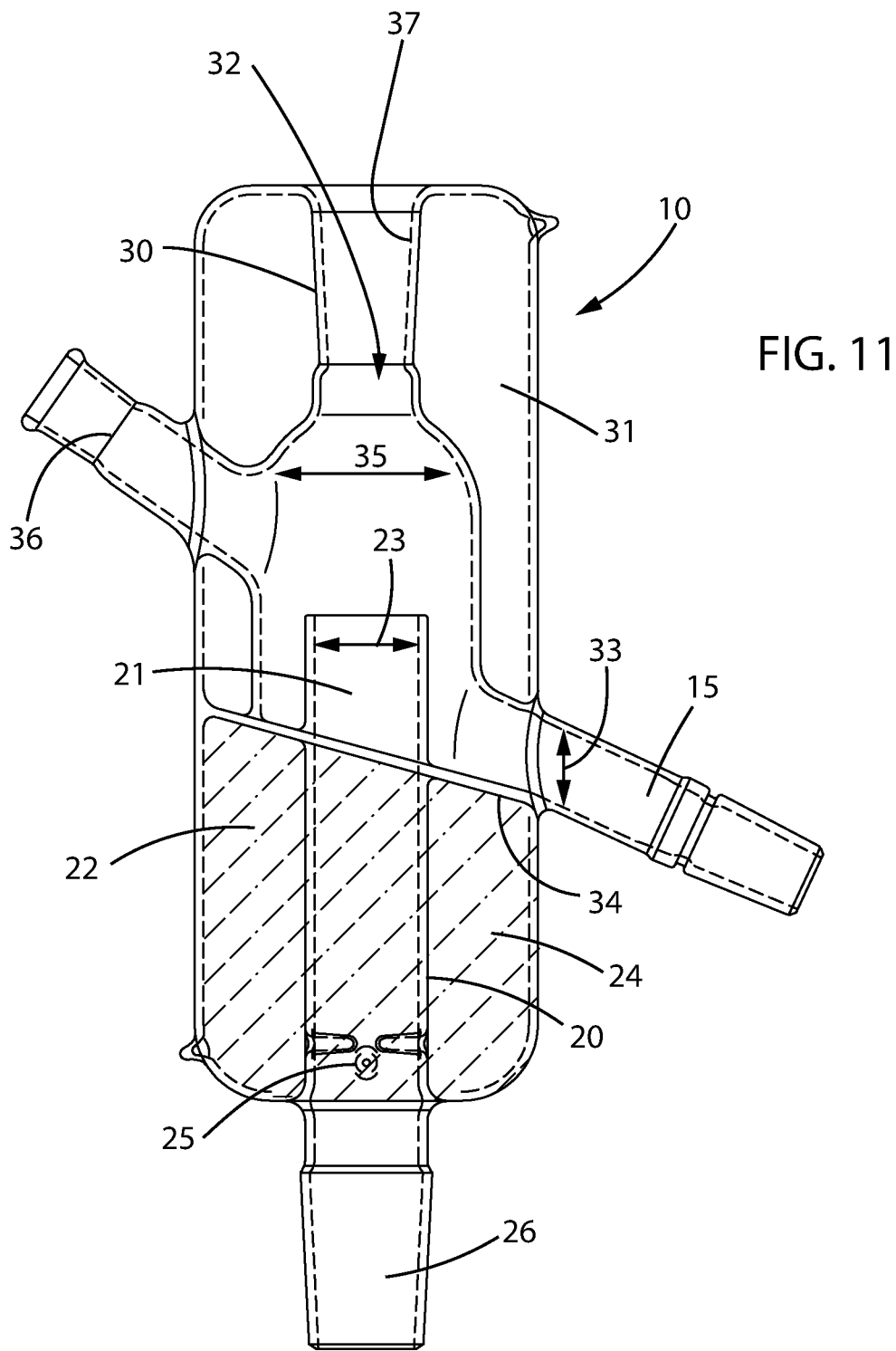
FIG. 11 is a side cutaway view of another embodiment of a distillation head, showing a larger diameter condenser and fractionating column.

In another embodiment, shown at FIG. 11, the distillation head is a cylinder that is approximately 300 mm long from a top end to a bottom end and has an outer diameter of 85 mm. In one embodiment, the diameter of the interior of the condenser 32 is 80 mm. In one embodiment, the interior diameter of the column 21 is 30 mm. In one embodiment, the interior diameter of the distillation port 15 is 18.4 mm. In one embodiment, the fractionating column 21 extends about 30 mm above the floor 34 of the condenser 32 and about 90 mm below the floor 34 of the condenser 32. In one embodiment, the fractionating column 21 extends an additional approximately 65 mm through a joint 26 at the bottom of the distillation head 10. In one embodiment, the floor 34 is angled at about an 82° angle from the vertical fractionating column 21 (i.e., 8 degrees downward from the horizontal). In one embodiment, the distillation port 15 continues out of the condenser 32 from the floor 34 at a 65° angle from the vertical. In one embodiment, the distillation port 15 extends about 85 mm from the exterior of the condenser 32. In one embodiment, the inlet port 36 is positioned at a 55° angle from the vertical fractionating column 21 and extends about 55 mm from the exterior of the condenser 32, including the joint. In one embodiment, the fractionating column 21 extends an additional approximately 65 mm through a joint 26 at the bottom end of the distillation head 10. In one embodiment, as shown in FIG. 11, the interior walls of the fractionating column 21 are straight as the column 21 passes through the floor 34. In one embodiment, the fractionating column 21 has a restriction area 25 in the bottom half of the column 21 that is formed by four indents positioned around the interior of the column, each at about 90° apart from the next. In one embodiment, the two of the indents are on one vertical plane and two of the indents are on another vertical plane, each plane separated, in one embodiment, by approximately 5 mm. In one embodiment, the restriction area is about 15 mm above the bottom of the lower insulation chamber 22. In one embodiment, the condenser is about 145 mm long, extending from the floor 34 to the top of the distillation head 10. In one embodiment, the distillation head 10 is about 235 mm from the top of the exterior of the upper insulation chamber 31 to the bottom of the exterior of the lower of the lower insulation chamber 22. In one example, a joint 26 at the bottom of the column 21 extends about 65 mm from the end of the lower insulation chamber 22. In one embodiment, the silver lining 24 covers the interior of the lower insulation chamber 22 starting below the floor 34.

Figure 12:
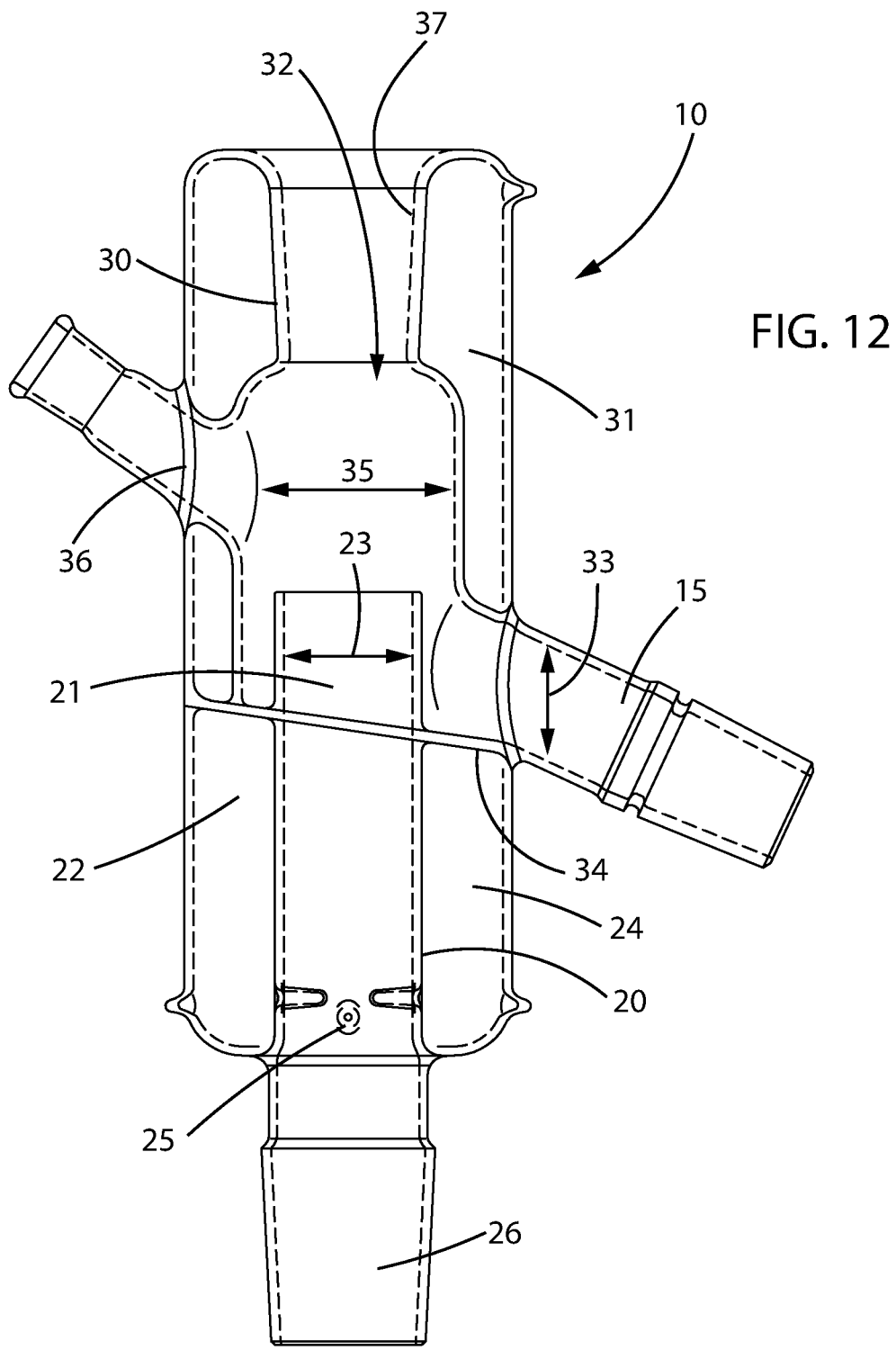
FIG. 12 is a side cutaway view of another embodiment of a distillation head, showing a larger diameter condenser and a wider exit port.

In yet another embodiment, shown at FIG. 12, the distillation head is a cylinder that is approximately 310 mm long from a top end to a bottom end and has an outer diameter of 85 mm. In one embodiment, the diameter of the interior of the condenser 32 is 80 mm. In one embodiment, the interior diameter of the column 21 is 40 mm. In one embodiment, the diameter of the distillation port 15 is 30 mm. In one embodiment, the fractionating column 21 extends about 30 mm above the floor 34 of the condenser 32 and about 90 mm below the floor 34 of the condenser 32. In one embodiment, the floor 34 is angled at approximately an 82° angle from the vertical fractionating column 21 (approximately 8° angle downward from the horizontal). In one embodiment, the distillation port 15 continues out of the condenser 32 from the floor 34 at a 65° angle from the vertical. In one embodiment, the distillation port 15 extends about 85 mm from the exterior of the condenser 32. In one embodiment, the optional inlet port 36 is positioned at a 55° angle from the vertical fractionating column 21 and extends about 55 mm from the exterior of the condenser 32. In one embodiment, the interior walls of the fractionating column 21 are straight as the column 21 passes through the floor 34. In one embodiment, the fractionating column 21 has a restriction area 25 in the bottom half of the fractionating column 21 that is formed by four indents positioned around the interior of the column, each at about 90° apart from the next. In one embodiment, the two of the indents are on one vertical plane and two of the indents are on another vertical plane, separated, in one embodiment, by approximately 5 mm. In one embodiment, the restriction area is about 15 mm above the bottom of the lower insulation chamber 22. In one embodiment, the restriction area 25 is used to support additional packing material (not shown) when inserted in the column 21. In one embodiment, the condenser is about 140 mm long, including the joint, extending from the floor 34 to the top of the distillation head 10. In one embodiment, the distillation head 10 is about 235 mm from the top of the exterior of the upper insulation chamber 31 to the bottom of the exterior of the lower of the lower insulation chamber 22. In one example, a joint 26 at the bottom of the fractionating column 21 extends about 75 mm from the bottom of the lower insulation chamber 22. In one embodiment, the silver lining 24 covers the interior of the lower insulation chamber 22 starting below the floor 34.

Figure 37:
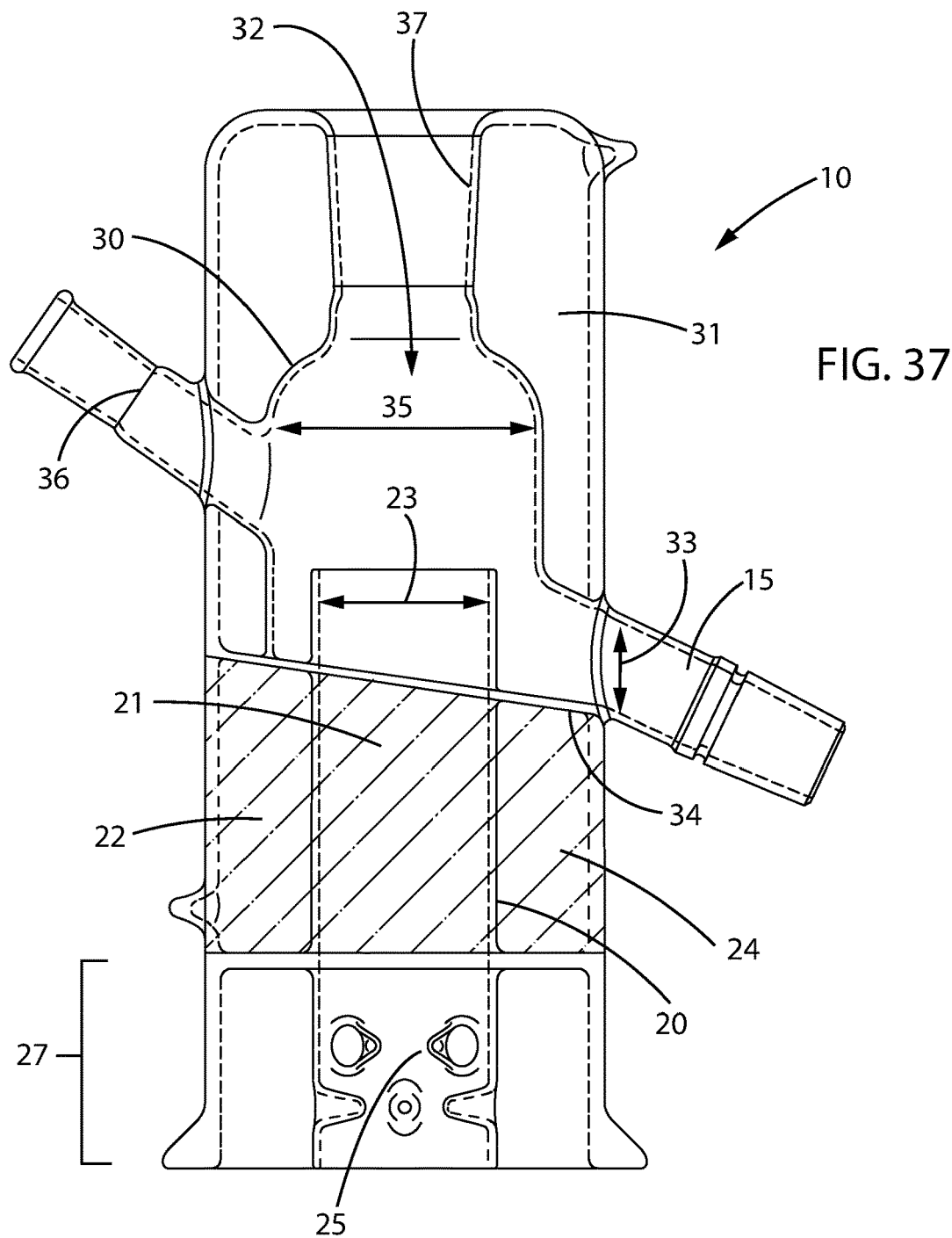
FIG. 37 is a right side cutaway view of a distillation head a distillation head according to selected embodiments of the current disclosure, showing a larger diameter condenser and an open bottom design to fit a flanged flask.
Figure 38:
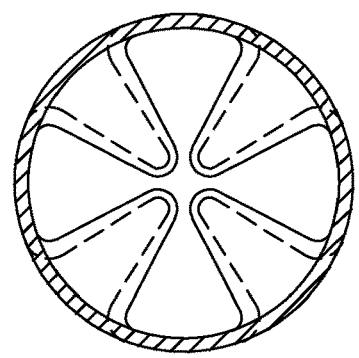
FIG. 38 is a top close up view of the embodiment of a distillation head from FIG. 37, showing detail of Vigreux indents in the column.

FIGS. 13 to 23 and 37 to 38 show another embodiment of the distillation head, which is a cylinder (FIG. 37 provides numbering) that is 345 mm long from a top end to a bottom end and has an outer diameter of 130 mm. In one embodiment, the diameter of the interior of the condenser 32 is 86 mm. In one embodiment, the interior diameter of the column 21 is 56-60 mm. In one embodiment, the diameter of the distillation port 15 is 30 mm. In one embodiment, the fractionating column 21 extends about 30 mm above the floor 34 of the condenser 32 and about 165 mm below the floor 34 of the condenser 32. In one embodiment, the floor 34 is angled at approximately an 82° angle from the vertical fractionating column 21 (i.e., approximately 8° downward from the horizontal). In one embodiment, the distillation port 15 continues out of the condenser 32 from the floor 34 at approximately a 65° angle from the vertical. In one embodiment, the distillation port 15 extends about 85 mm from the exterior of the condenser 32. In one embodiment, the inlet port 36 is positioned at a 55° angle from the vertical fractionating column 21 and extends about 75 mm from the exterior of the condenser 32. In one embodiment, as shown in close up FIG. 37, the interior walls of the fractionating column 21 are straight as the fractionating column 21 passes through the floor 34. In one embodiment, the fractionating column 21 has indents 25 in the bottom half of the column 21 positioned around the interior of the column, each at about 90° apart from the next. In one embodiment, two or more of the indents are on one vertical plane and two or more of the indents are on another vertical plane. In some embodiments, the fractionating column can have two, three, four, or more indents on each vertical plane. In some embodiments, the fractionating column can have one, two, three, or more vertical planes of indents. In some embodiments, each plane of indents is rotated so that the indents do not align vertically from one plane to another. In one embodiment, the indents of one plane bisect the spaces between the indents of another plane. The planes are separated vertically, in one embodiment, by approximately 20 mm. FIG. 38 shows indents as seen looking downward through the fractionating column 21. In one embodiment, the restriction area 25 is about 30 mm below the bottom of the lower insulation chamber 22. In one embodiment, the restriction area 25 can support additional packing material in the column 21. In one embodiment, the condenser is about 175 mm long, extending from the floor 34 to the top of the distillation head 10. In one example, a reactor lid clamp 27 at the bottom of the column 21 extends about 70 mm from the end of the lower insulation chamber 22. In one embodiment, the distillation head 10 is about 245 mm from the top of the exterior of the upper insulation chamber 31 to the bottom of the exterior of the lower of the lower insulation chamber 22. In one embodiment, the silver lining 24 covers the interior of the lower insulation chamber 22 starting below the floor 34.

Figure 13:
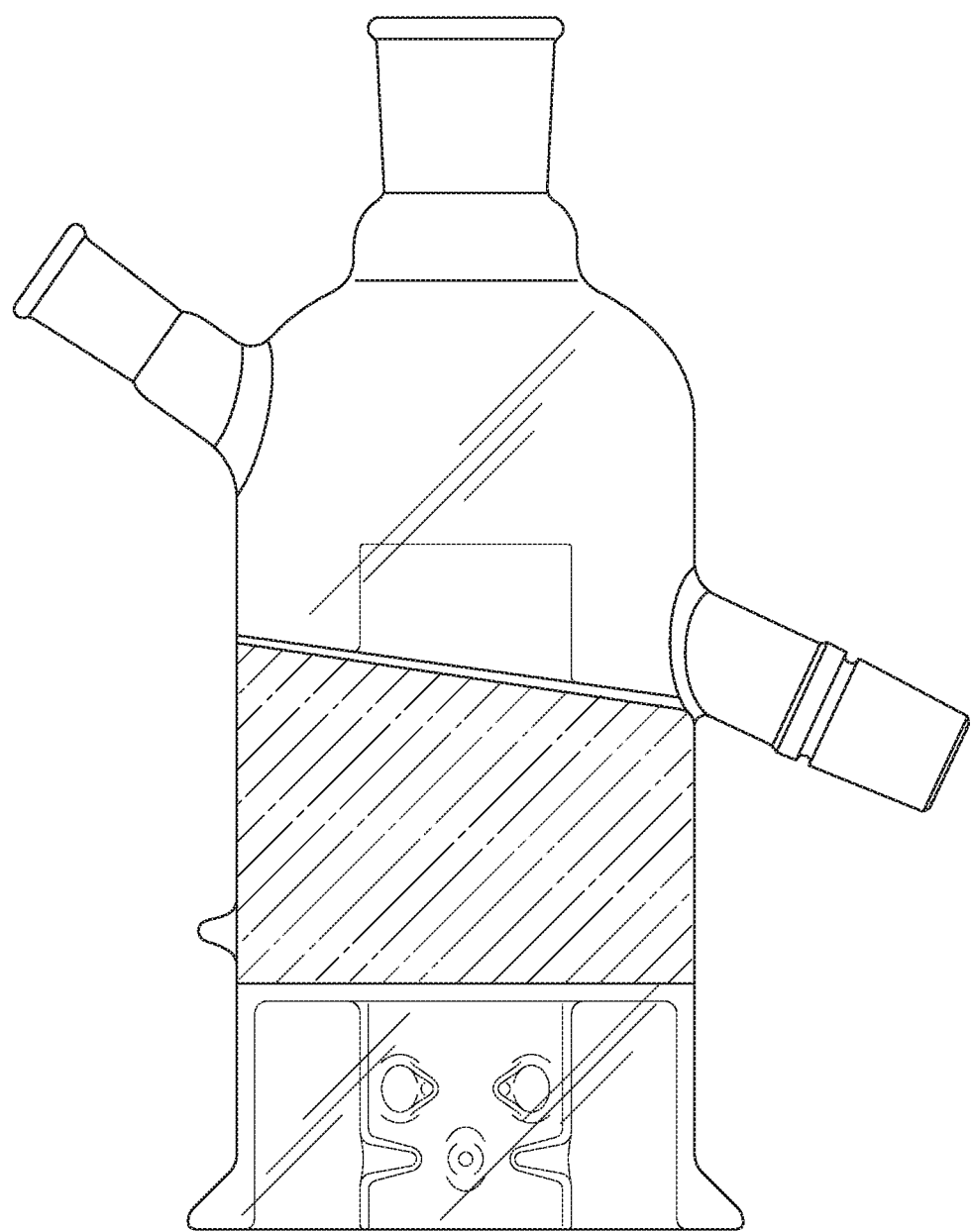
FIG. 13 is a right side elevational view of a distillation head according to selected embodiments of the current disclosure.
Figure 14:
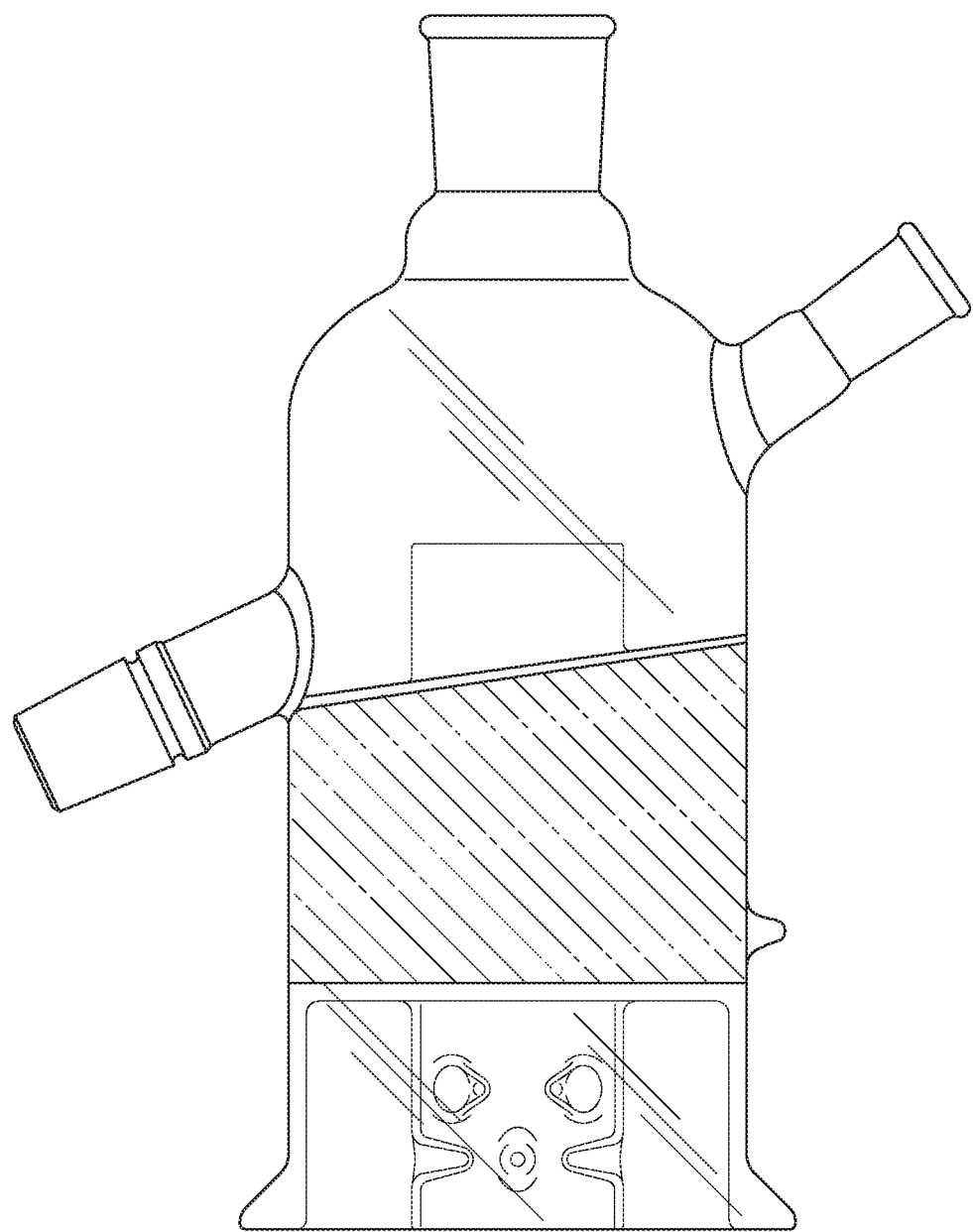
FIG. 14 is a left side elevational view of a distillation head according to selected embodiments of the current disclosure.
Figure 15:
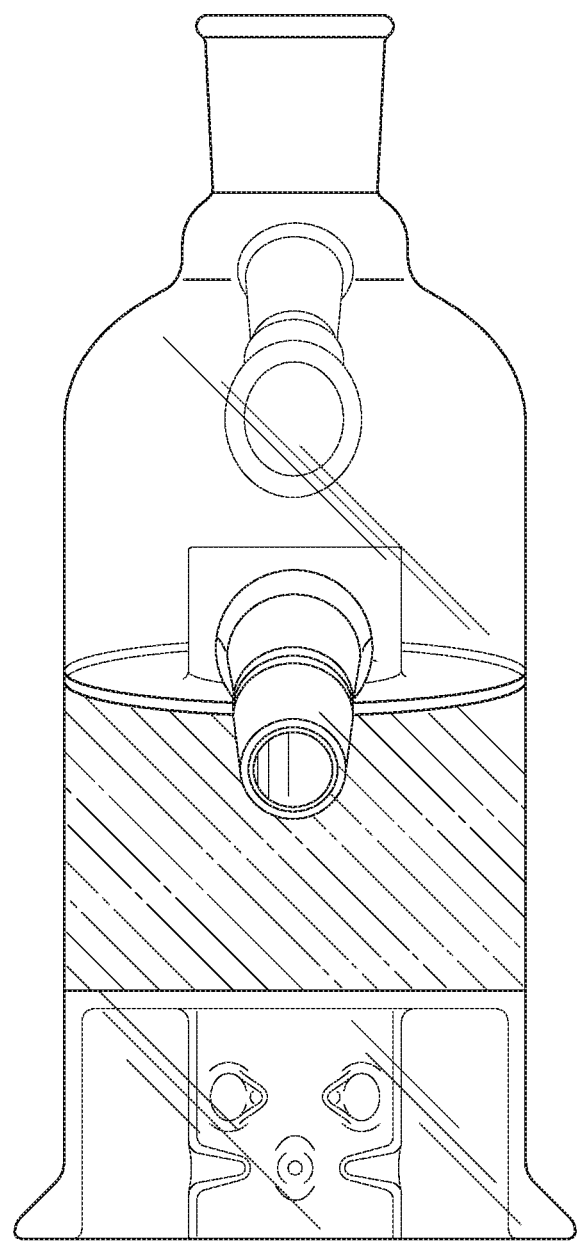
FIG. 15 is a front elevational view of a distillation head according to selected embodiments of the current disclosure.
Figure 16:
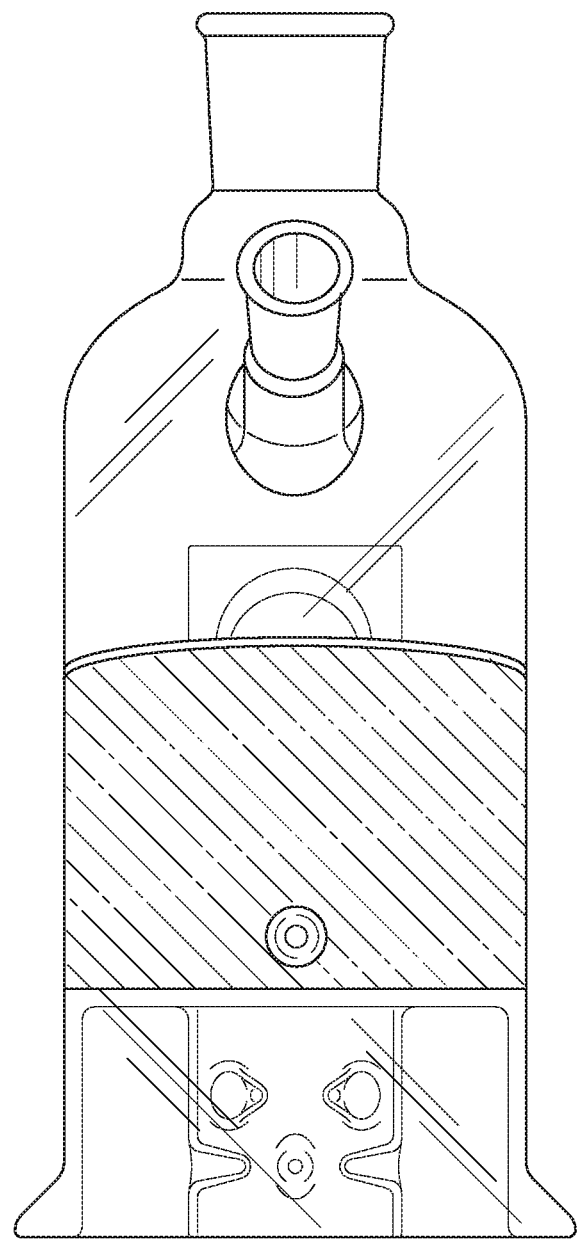
FIG. 16 is a rear elevational view of a distillation head according to selected embodiments of the current disclosure.
Figure 17:
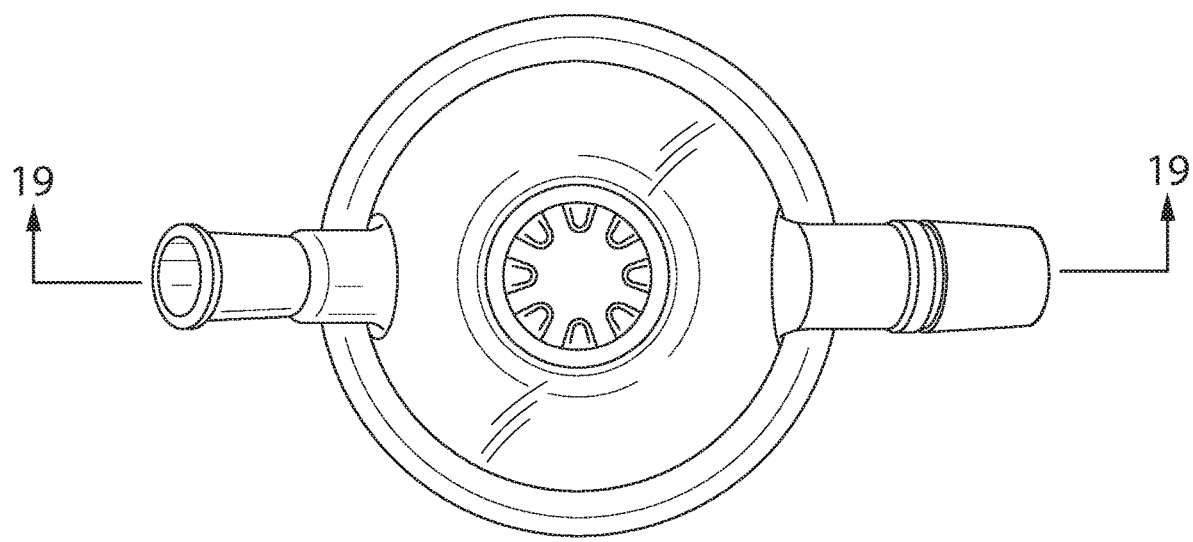
FIG. 17 is a top elevational view of a distillation head cutaway from just above the fractionating column, according to selected embodiments of the current disclosure.
Figure 18:
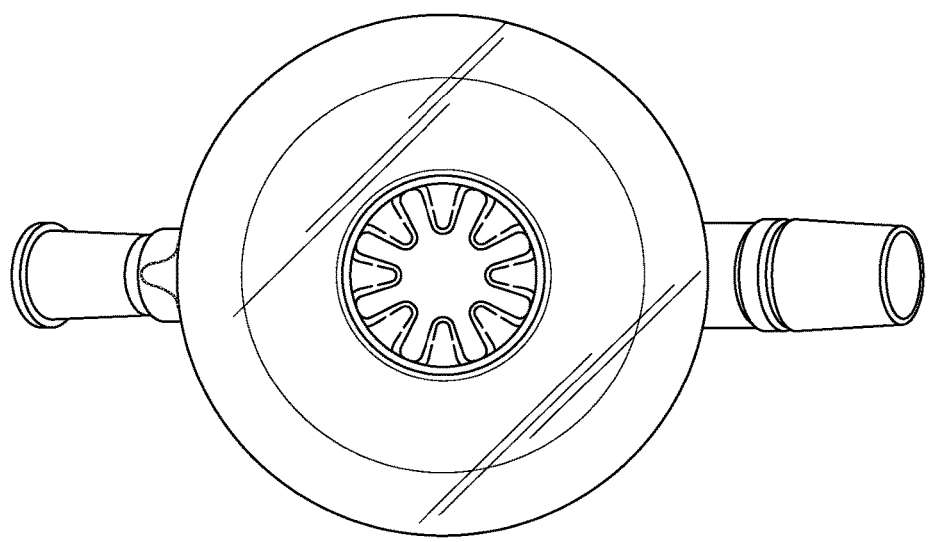
FIG. 18 is a top elevational view of a distillation head cutaway from about halfway up the lower vacuum jacket, according to selected embodiments of the current disclosure.
Figure 19:
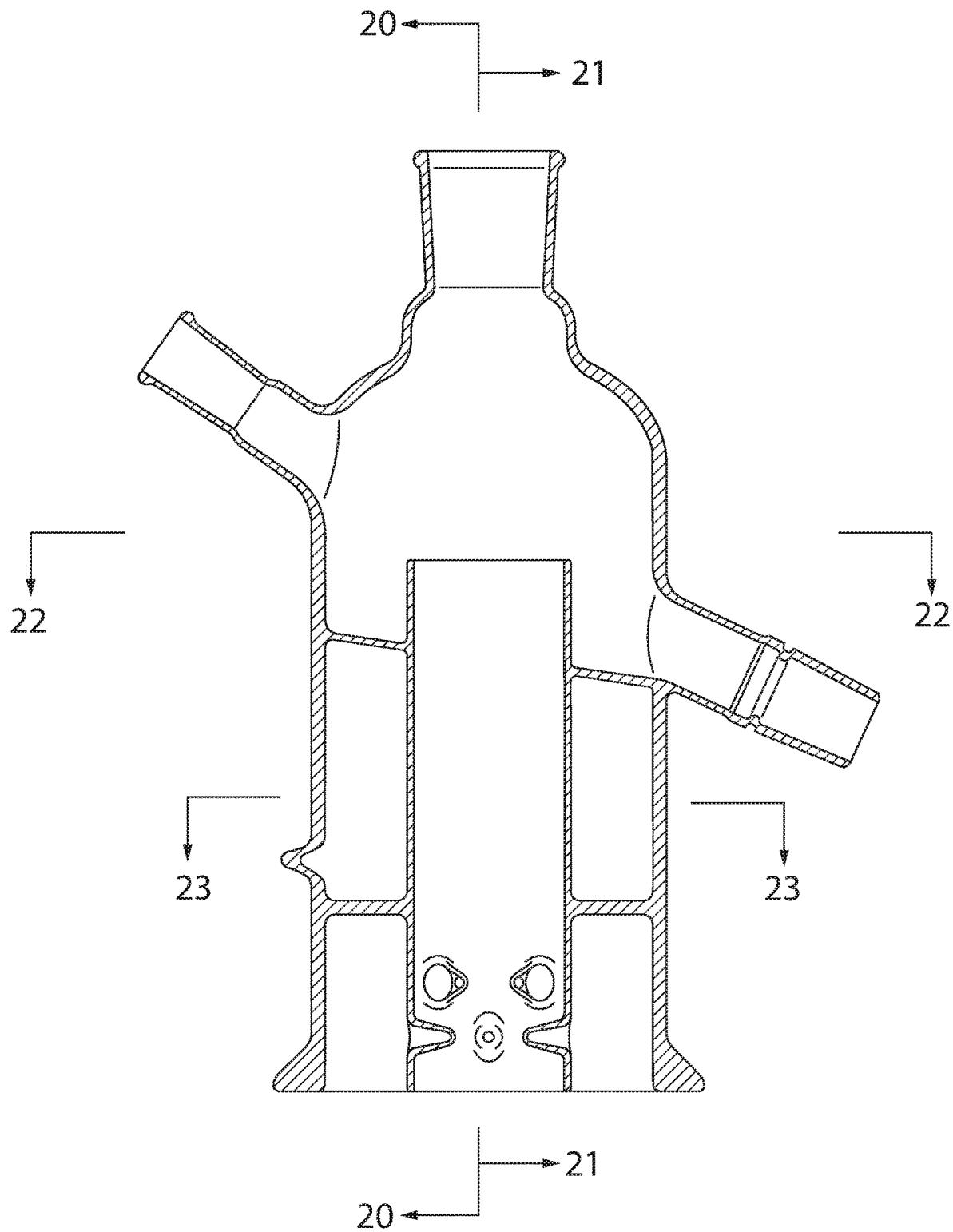
FIG. 19 is a right side cutaway view of a distillation head according to selected embodiments of the current disclosure.
Figure 20:
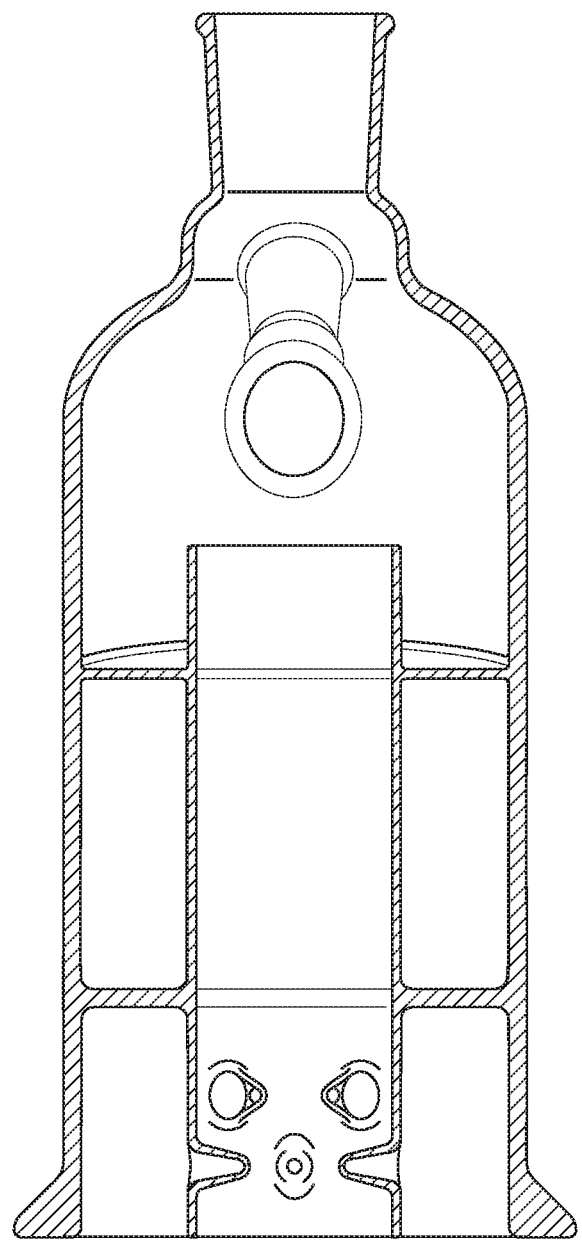
FIG. 20 is a front cutaway view of a distillation head according to selected embodiments of the current disclosure.
Figure 21:
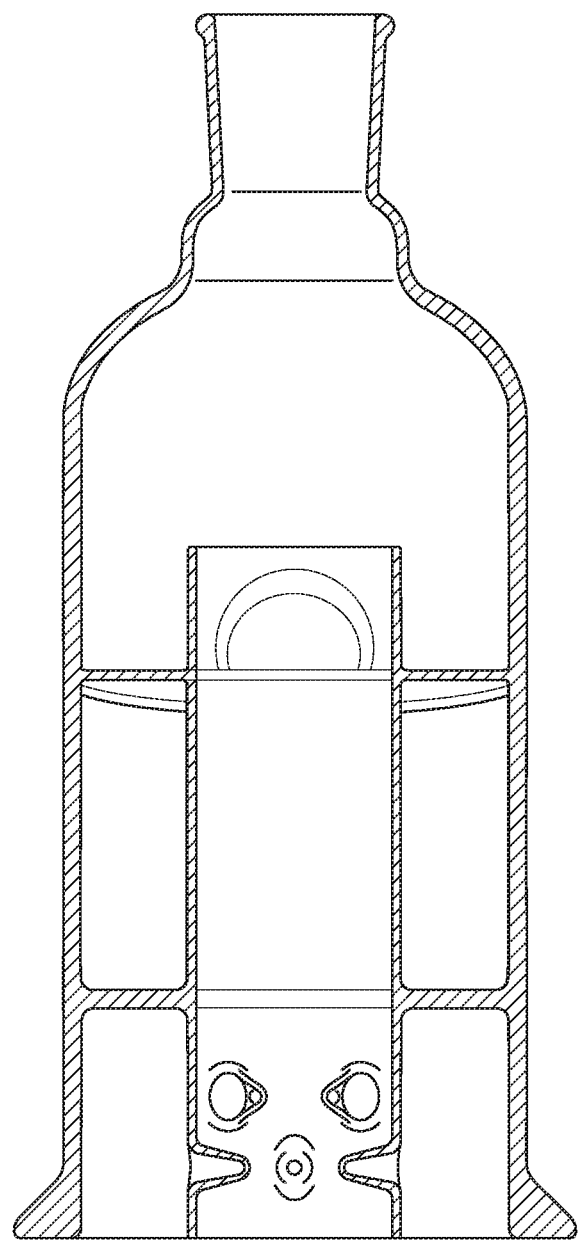
FIG. 21 is a rear cutaway view of a distillation head according to selected embodiments of the current disclosure.
Figure 22:
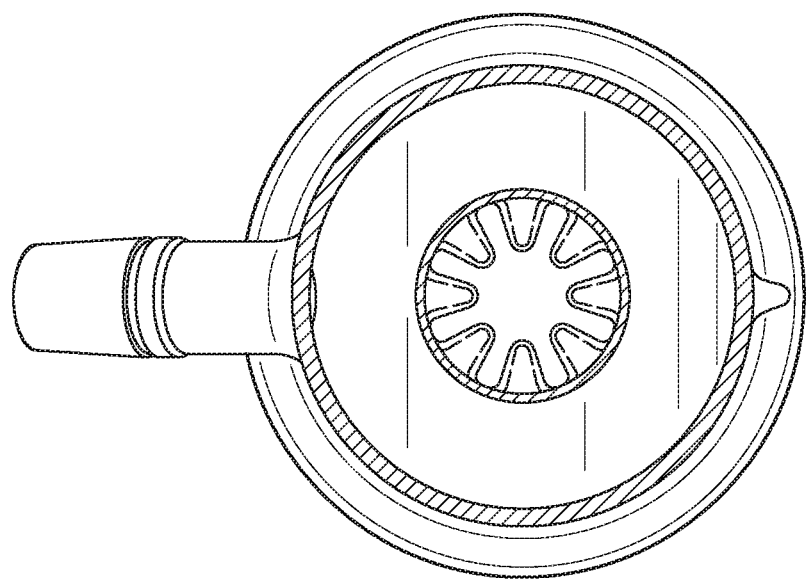
FIG. 22 is a top cutaway view of a distillation head according to selected embodiments of the current disclosure.
Figure 23:
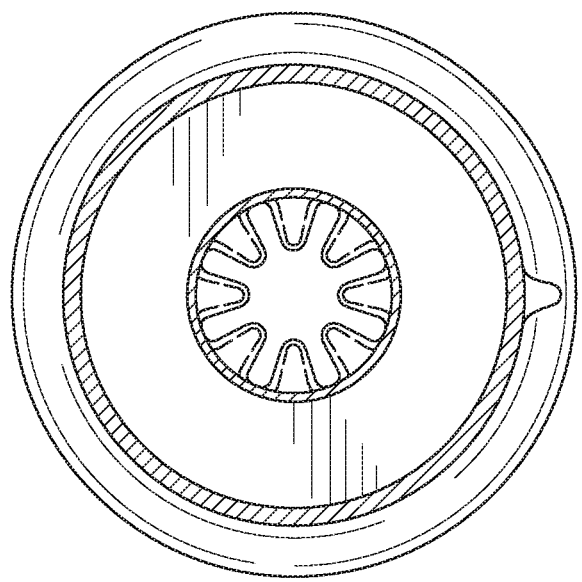
FIG. 23 is a top cutaway view of a distillation head according to selected embodiments of the current disclosure.

In particular, FIG. 13 shows an embodiment of the current disclosure from a right side elevational view with a reactor lid clamp rather than a joint at the bottom, a slivered vacuum jacket surrounding the fractionating column, with a portion of the fractionation column extending above the mirrored vacuum jacket inside the condenser. This embodiment has an exit port and two inlet ports, one at the top and one off the top left side. FIG. 14 shows the opposite side of the device from FIG. 13, with all of the same features from the opposite view. FIG. 15 shows a front elevational view of the embodiment of the distillation head from the previous figures showing the exit port 15 obscuring part of the top of the distillation port. As the device is glass, the inlet port on the back side of the device can be seen extending at an angle upward on the back side of the device. FIG. 16 a back elevational view of the same embodiment, showing, in particular, the inlet port extending upward at an angle from the back of the device. The silvered area is taller on the back view of the device because the floor of the condenser chamber also forms the top of the lower vacuum chamber and slopes downward from the back of the device to the front where the exit port is located. FIG. 17 shows a top elevational view in which the exit port is shown on the right side and an inlet port is shown on the left side. The view shows into the top inlet port through the fractionating column below. The eight vigreux indents of this particular embodiment can be seen inside (around the perimeter of) the fractionating column. FIG. 18 shows a bottom elevational view in which the inlet port is on the left side and the exit port is on the right side of the figure. This view shows into the circular bottom of the distillation head. The eight vigreux indents of this embodiment are shown inside the fractionating column and appear larger than FIG. 17 only because they are closer to the view. FIG. 19 shows a right side cutaway view of the device showing the orientations of FIGS. 20 to 23. This view shows that the vigreux indents can be on different vertical planes inside the fractionating column. FIG. 20 shows a front cutaway view of the device with an exit port cutaway and showing the inlet port on the back through the glass extending up from the back wall. This view shows the upper and lower bounds of the lower vacuum jacket surrounding the fractionating column. The lighter shaded horizontal partitions shown in the fractionating column are not actually in the fractionating column, but are actually the top and bottom portions of the lower vacuum jacket outside the fractionating column, but viewable through the glass walls of the fractionating column; they do not obstruct the fractionating column. FIG. 21 shows a back cutaway view of the device with the inlet port on the back of the device removed and showing just the top of the exit port, partially obscured by the silvered vacuum jacket around the fractionating column. FIGS. 22 and 23 show top cutaway view of one embodiment, FIG. 22 being cut away from just above the fractionating column and FIG. 23 being cut away from about halfway up the lower vacuum jacket. The exit port is shown on the left of FIG. 22, but is cut way on FIG. 23.

Jumping to FIG. 37, FIG. 37 is another right side cutaway view described in greater detail previously.

FIG. 38 shows, in one embodiment, a top view of a single ring of indents in a fractionating column, having four indents on the same vertical plane, each indent positioned 90 degrees from the next indent forming a ring. In other embodiments, one, two, three or more independent rings of indents are positioned on different vertical planes inside the fractionating column. For example, FIG. 37 shows two rings of indents 25, each ring formed by four different indents 25.

Figure 24:
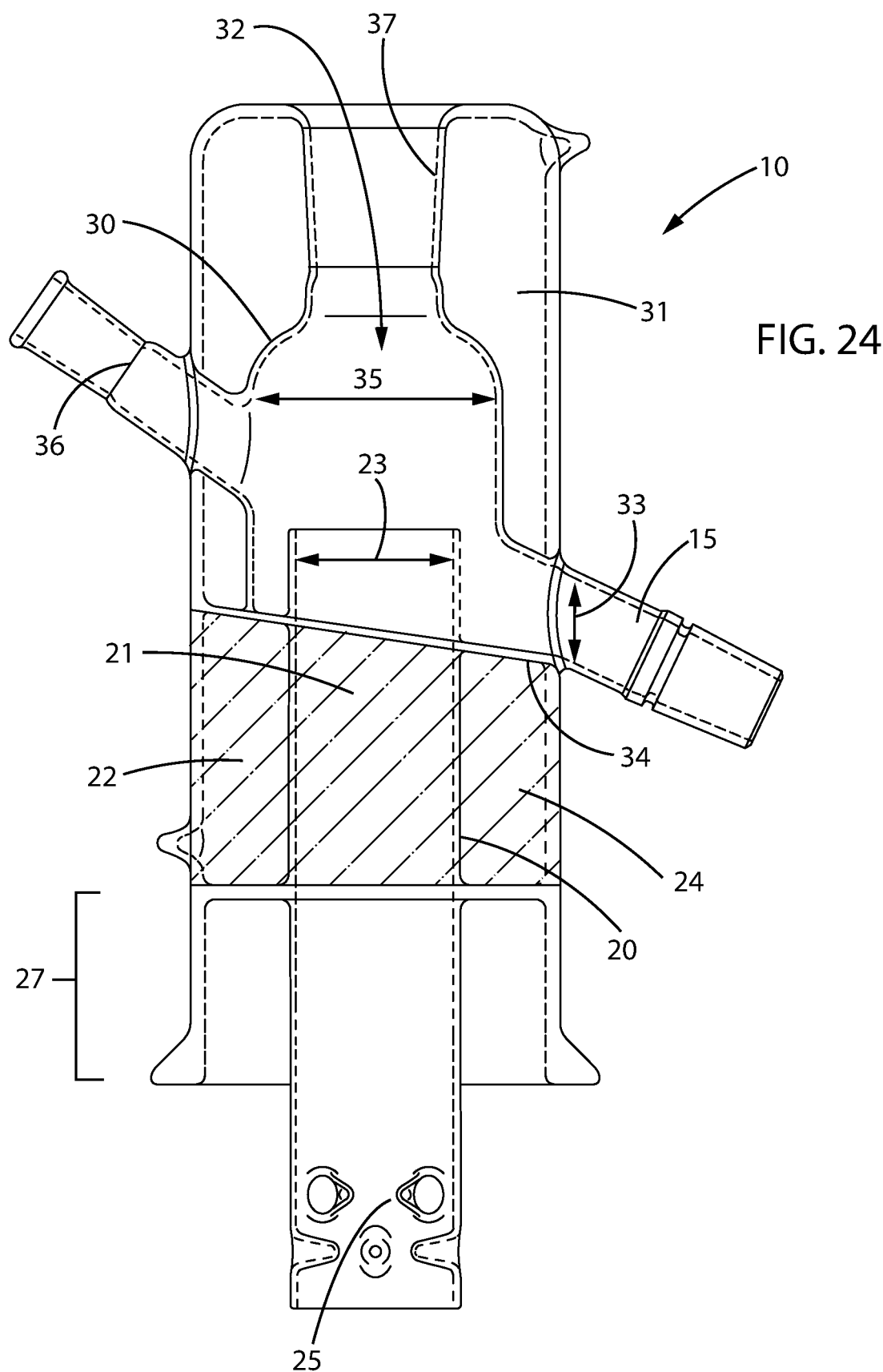
FIG. 24 is a side cutaway view of another embodiment of a distillation head, showing a larger diameter condenser and an open bottom design to fit a flanged flask, with the fractionating column extending below the bottom of the distillation head.

Moving back in the figures to another embodiment, shown at FIG. 24, a distillation head 10 has features similar to the embodiment shown in FIGS. 13 to 23 and 37 to 38 except that the fractionating column 21 is longer so that it can extend down into a flask when the head is positioned on a flanged flask. In such an embodiment, the indents 25 can be moved lower in the fractionating column 21 (shown) or they can remain higher in the fractionating column (not shown).

Figure 25:
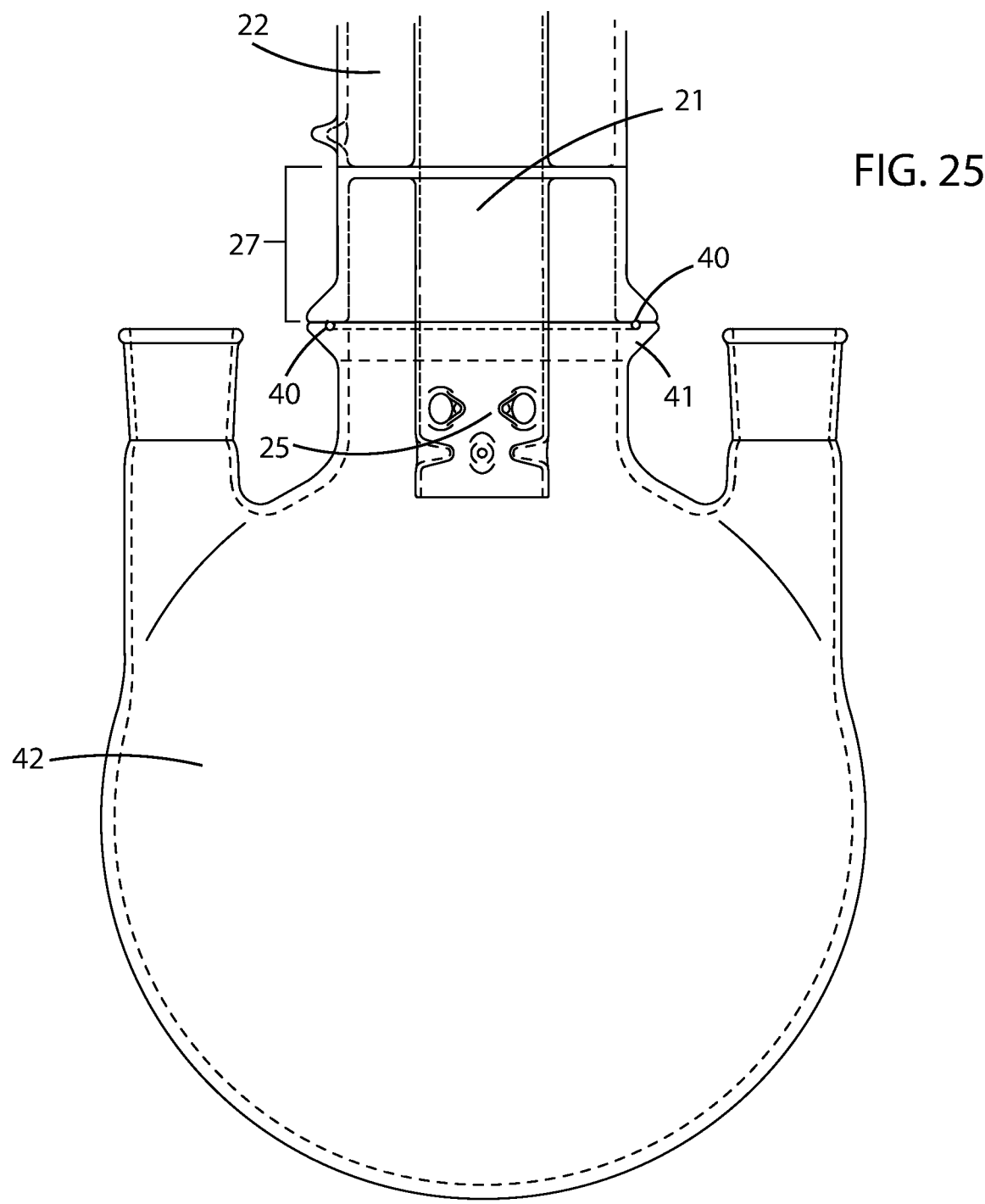
FIG. 25 is a side cutaway view of the intersection of a bottom of a distillation head of FIG. 24, attached to a round-bottom flanged flask, with the fractionating column extending below the bottom of the distillation head into the round-bottom flask.

FIG. 25 shows one embodiment of the distillation head 10 attached to a round-bottom flask 42. The flanges at the bottom of the distillation head fit the flanges of the flask 41, and an o-ring or gasket 40 seals the connection between the distillation head 10 and the flask 42. In one embodiment, the indents 25 at the bottom of the fractionating column 21 extend downward from the distillation head 10 into the flask 42. In such an embodiment, the gasket 40 connects a continuous pocket or area 27 around the fractionating column 21 with the flask 42. This pocket or area 27 becomes a continuation of the heated flask 42, having similar a similar temperature profile as the flask 42 and allows the heat from the flask 42 to heat the fractionating column 21 from multiple sides. In one embodiment, the bottom of the lower jacket 22 can be lower so that the area 27 is decreased. In another embodiment, the bottom of the lower jacket 22 can be higher so that the area 27 is increased. The flask 42 can be any flask or vessel with a mouth or opening that will seal to the bottom of the distillation head 10.

Figure 26:
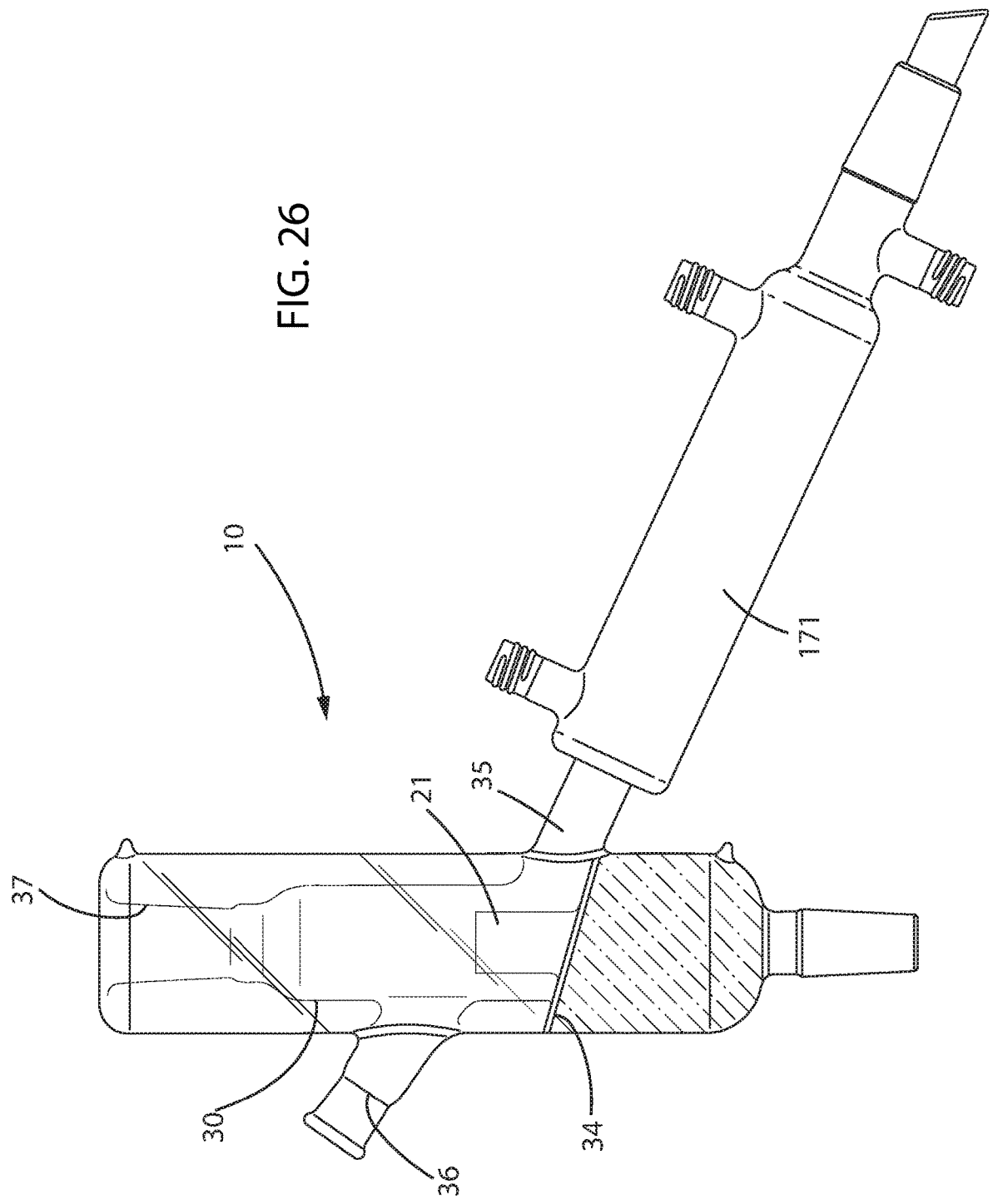
FIG. 26 is a right side elevational view of a distillation head according to selected embodiments of the current disclosure.
Figure 27:
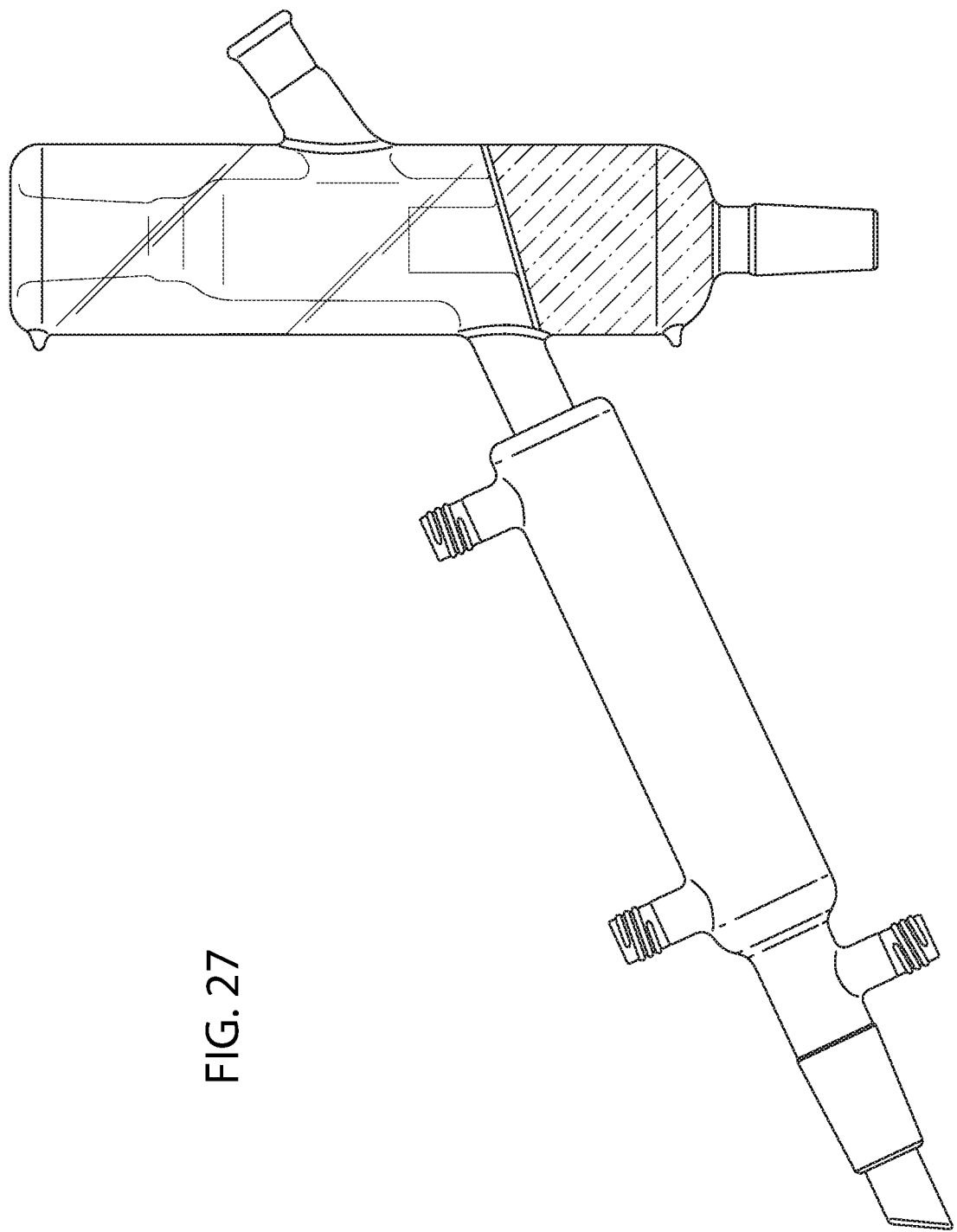
FIG. 27 is a left side elevational view of a distillation head according to selected embodiments of the current disclosure.
Figure 28:
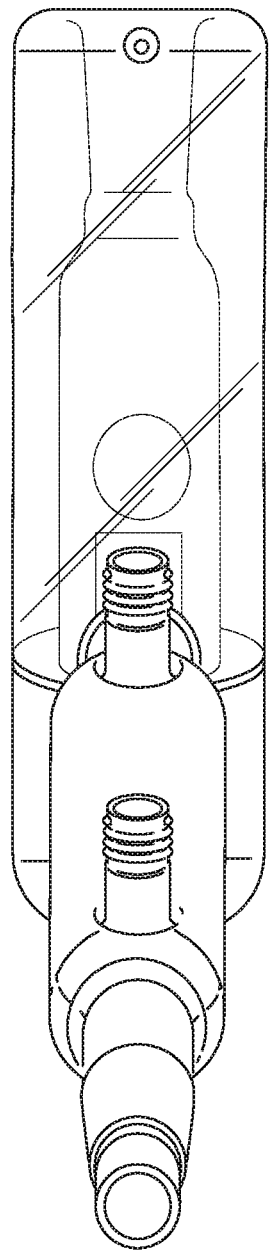
FIG. 28 is a front elevational view of a distillation head according to selected embodiments of the current disclosure.
Figure 29:
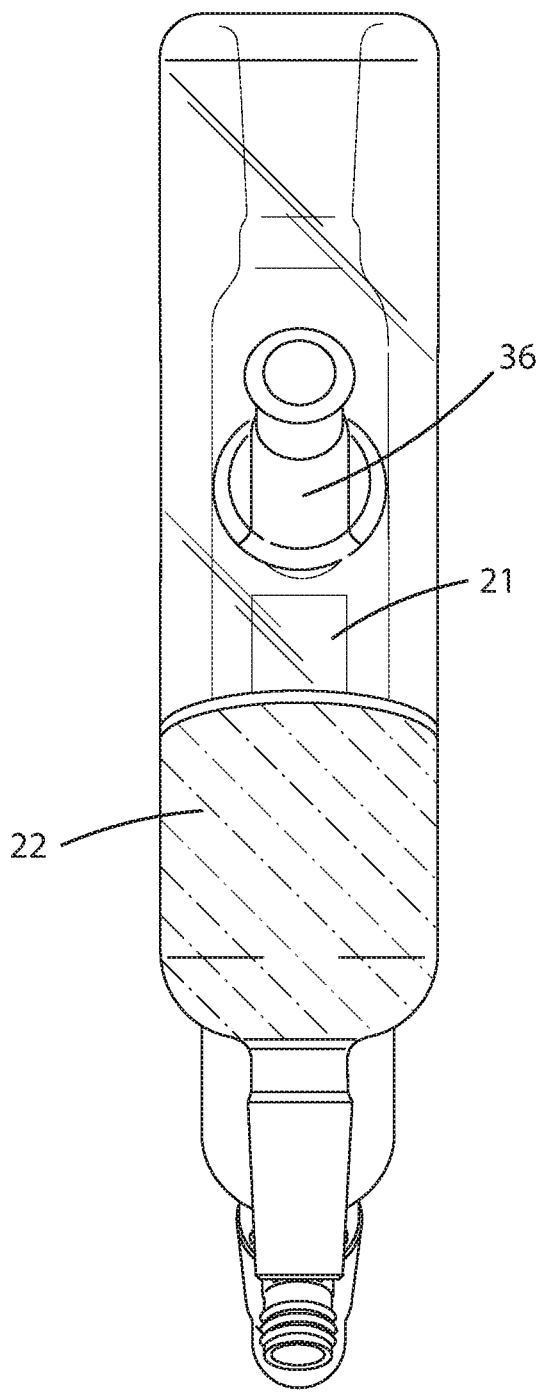
FIG. 29 is a rear elevational view of a distillation head according to selected embodiments of the current disclosure.
Figure 30:
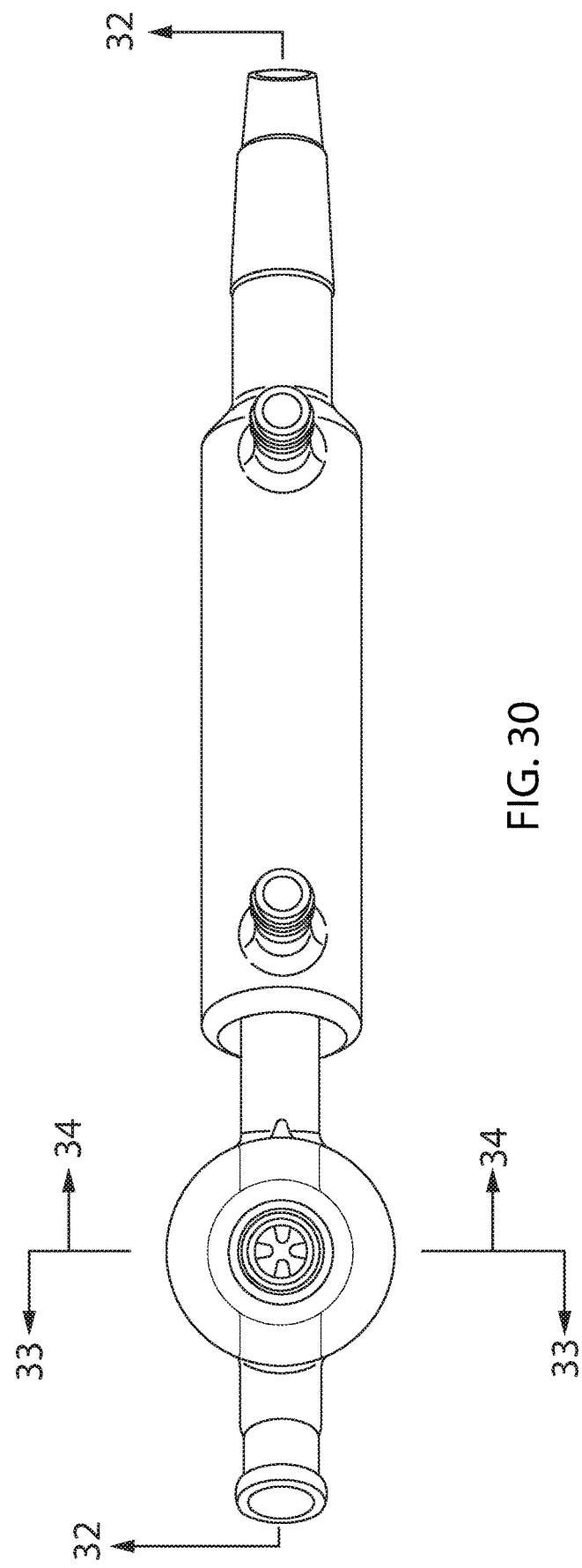
FIG. 30 is a top elevational view of a distillation head according to selected embodiments of the current disclosure.
Figure 31:
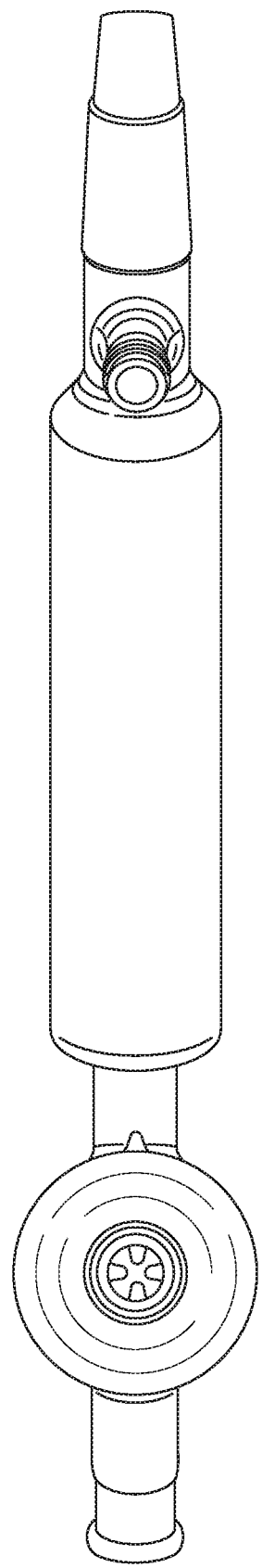
FIG. 31 is a bottom elevational view of a distillation head according to selected embodiments of the current disclosure.
Figure 32:
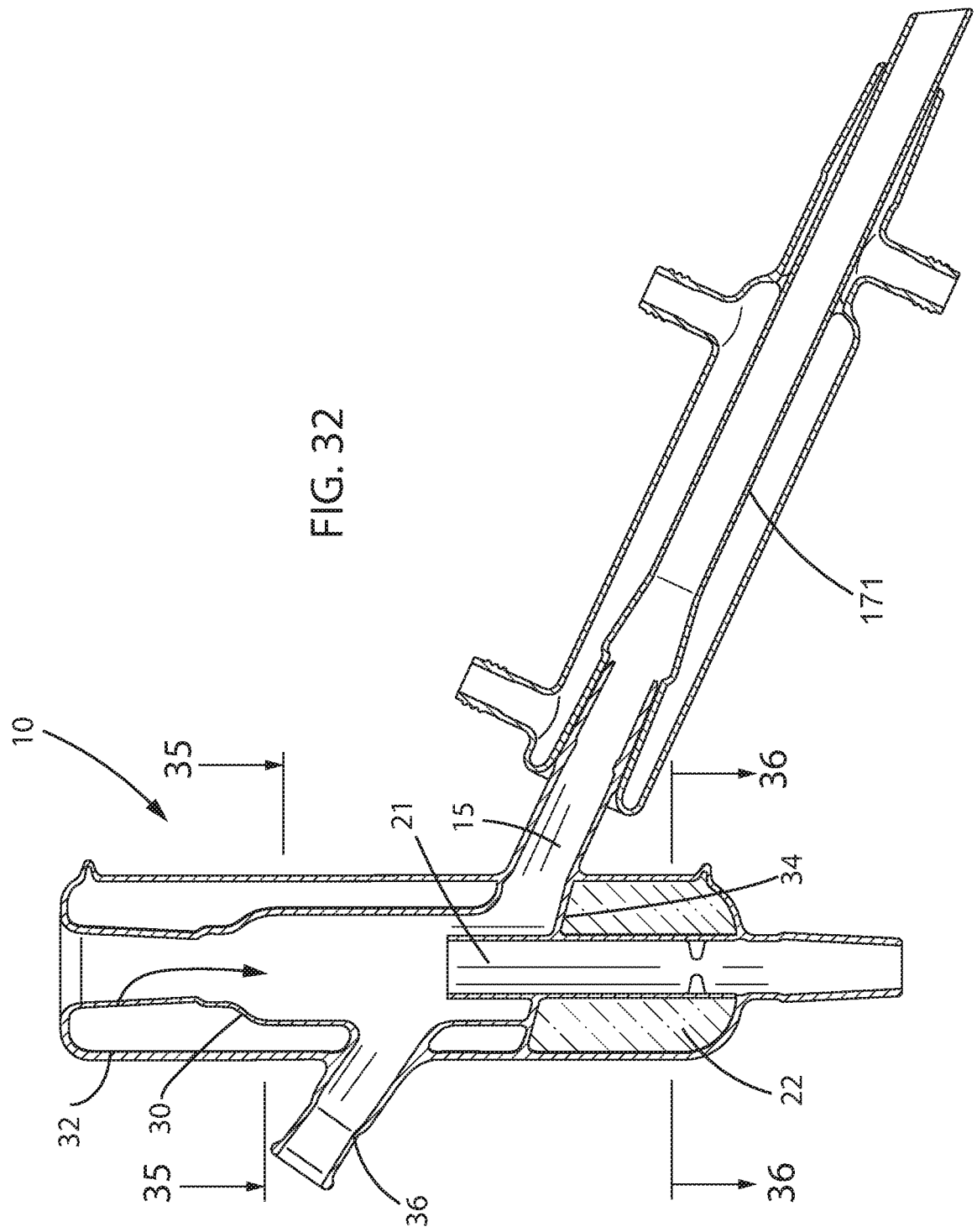
FIG. 32 is a right side cutaway view of a distillation head according to selected embodiments of the current disclosure.
Figure 35:
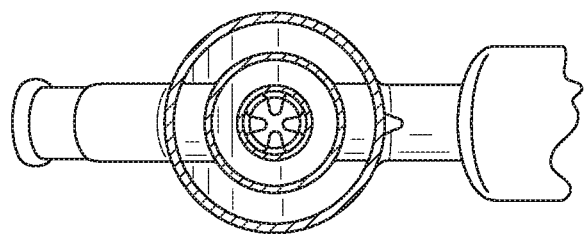
FIG. 35 is a bottom cutaway view of a distillation head according to selected embodiments of the current disclosure.
Figure 36:
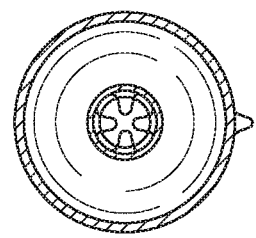
FIG. 36 is a top cutaway view of a distillation head according to selected embodiments of the current disclosure.

FIG. 26 shows a right side elevational view of another embodiment with a distillation head 10 and a secondary condenser 171. A distillation port 35 connects the distillation head 10 with the secondary condenser 171. The floor 34 of the condenser slopes downward toward the distillation port and forms the ceiling of the lower vacuum jacket. The wall 30 of the condenser is shown which also forms the wall of the upper vacuum jacket in this embodiment. FIG. 27 shows the left side elevational view of the same embodiment as FIG. 26 showing the opposite side of all the same features. FIG. 28 shows a front side elevational view of the same embodiment as FIG. 26 showing the same features from the front view. In particular, the secondary condenser is shown protruding out from the front of the device. FIG. 29 shows a rear elevational view of the embodiment from FIG. 26 showing the silvered lower vacuum jacket 22 and the fractionating column 21 extending up through the ceiling of the lower vacuum jacket. The inlet port 36 on the back of the device is also shown. FIG. 30 shows a top elevational view of the device showing the orientations of FIGS. 32 to 34. The secondary condenser is extending to the right and an inlet port to the left in this view. This view shows into the top inlet port through the fractionating column below. FIG. 31 shows a bottom elevational view of the same embodiment. FIG. 32 shows a side cutaway view of one embodiment, in particular showing a side cutaway view of the secondary condenser 171 with the vacuum jacket surrounding it. This view also shows an upper vacuum jacket 32, the inner wall 30 of the condenser, the silvered lower vacuum jacket 22, and the sloping floor 34 of the condenser. FIG. 33 shows a front cutaway view of the same embodiment as FIGS. 26-32. FIG. 34 shows a back cutaway view of the same embodiment as FIGS. 26-33. FIG. 35 shows a top cutaway view, cut from the top of the condenser with the inlet port extending from the left side. Four vigreux indents can be seen inside the fractionating column of this embodiment. Of course, the number of indents can vary. FIG. 36 shows a top cutaway view, cut at the lower half of the lower vacuum chamber.

Figure 39:
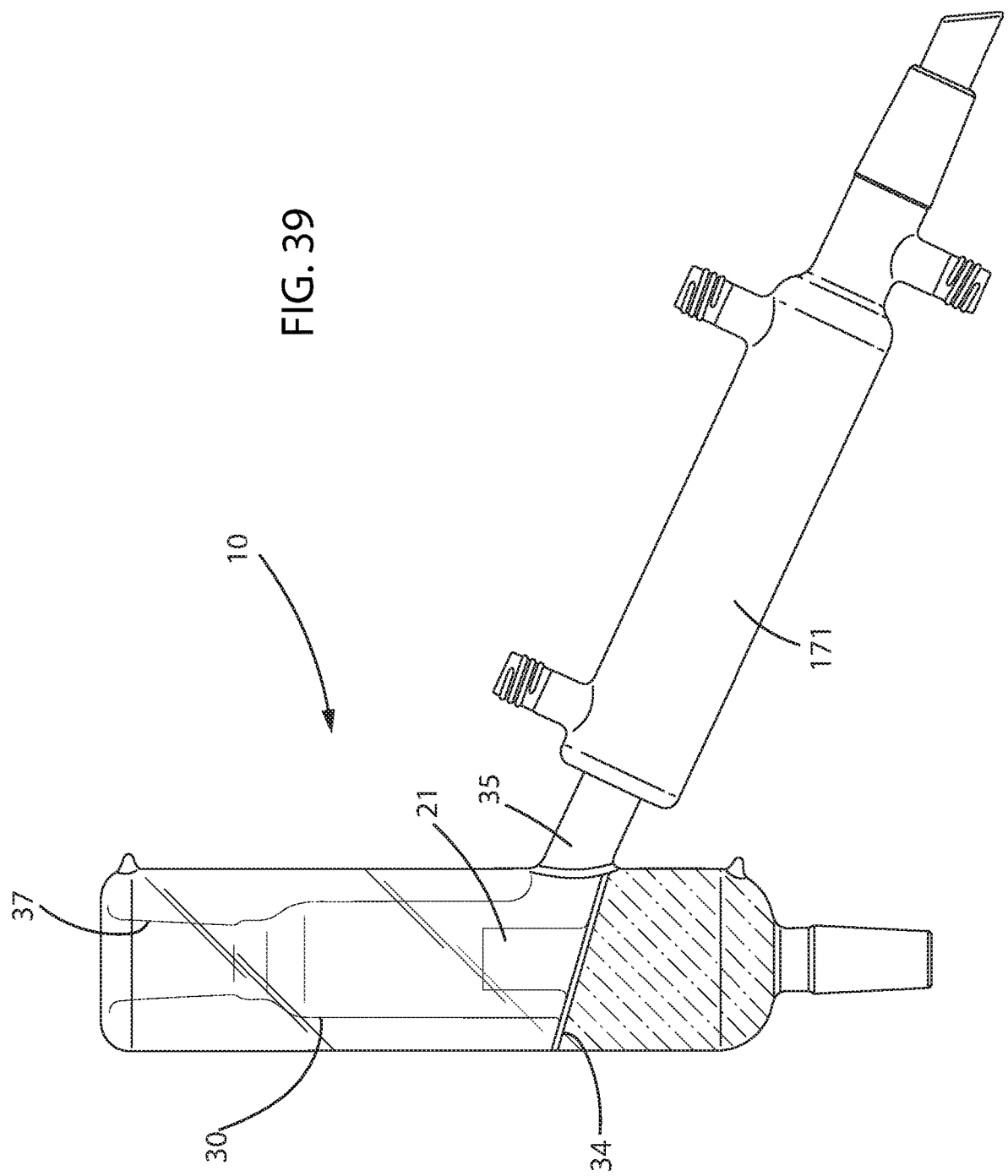
FIG. 39 is a right side elevational view of a distillation head according to selected embodiments of the current disclosure.
Figure 40:
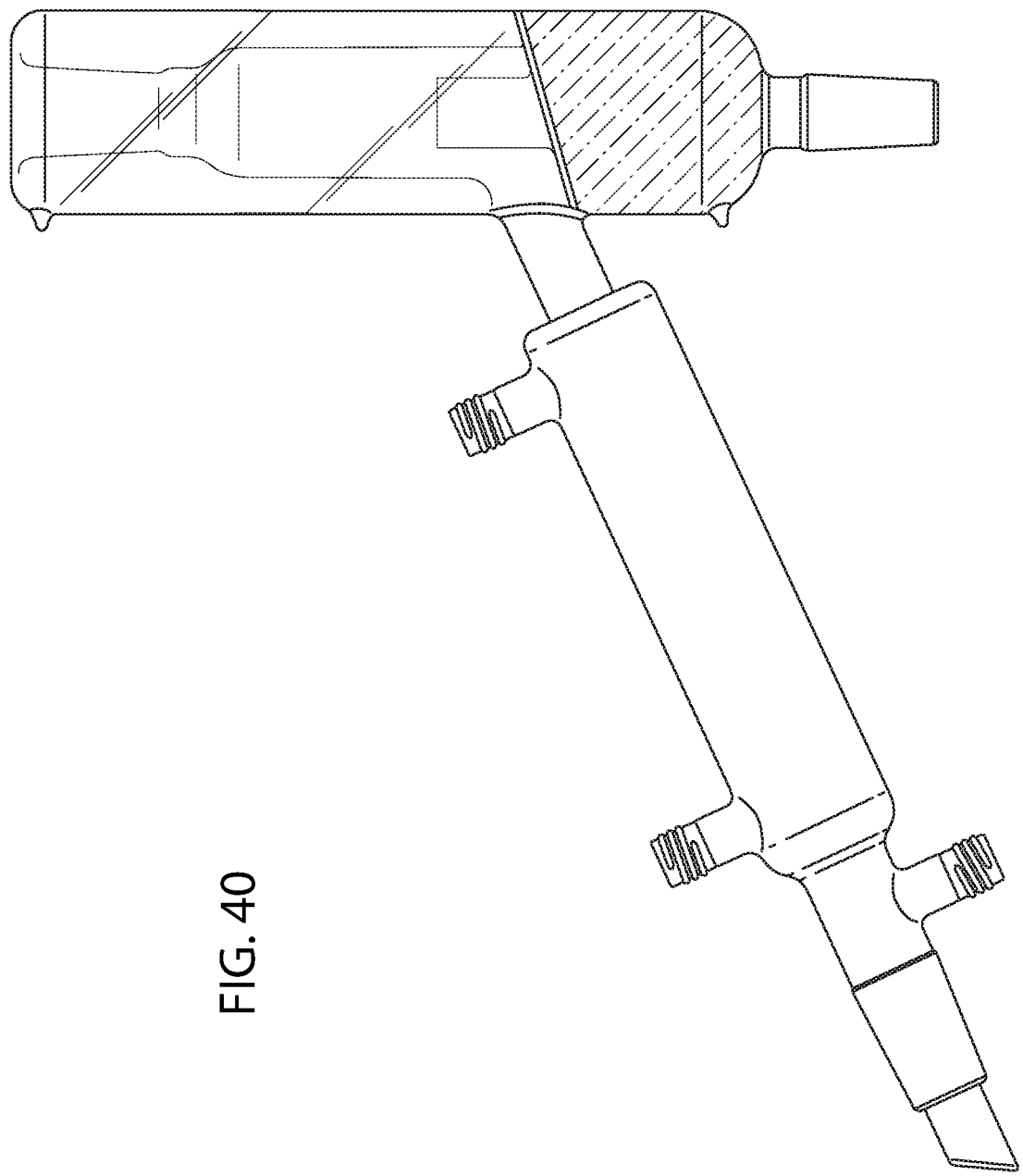
FIG. 40 is a left side elevational view of a distillation head according to selected embodiments of the current disclosure.
Figure 41:
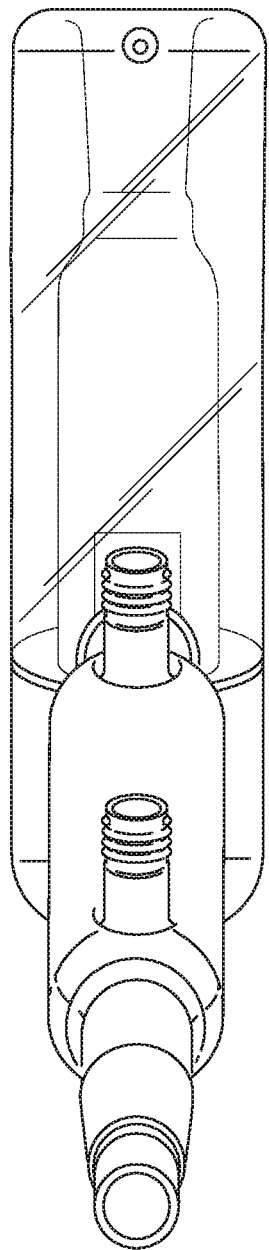
FIG. 41 is a front elevational view of a distillation head according to selected embodiments of the current disclosure.
Figure 42:
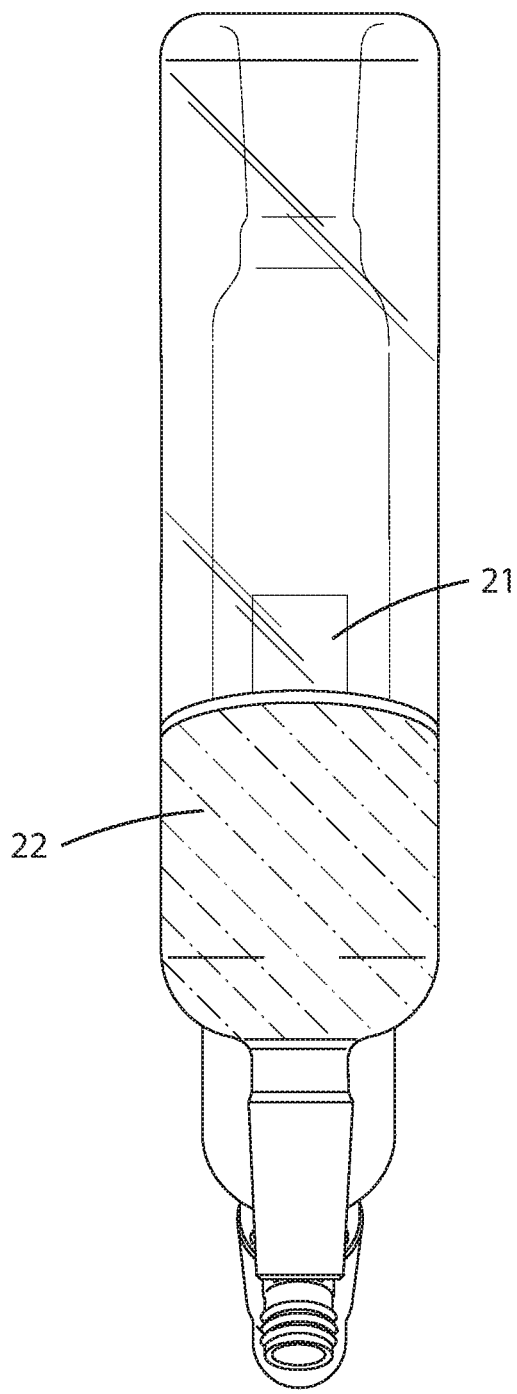
FIG. 42 is a rear elevational view of a distillation head according to selected embodiments of the current disclosure.
Figure 43:
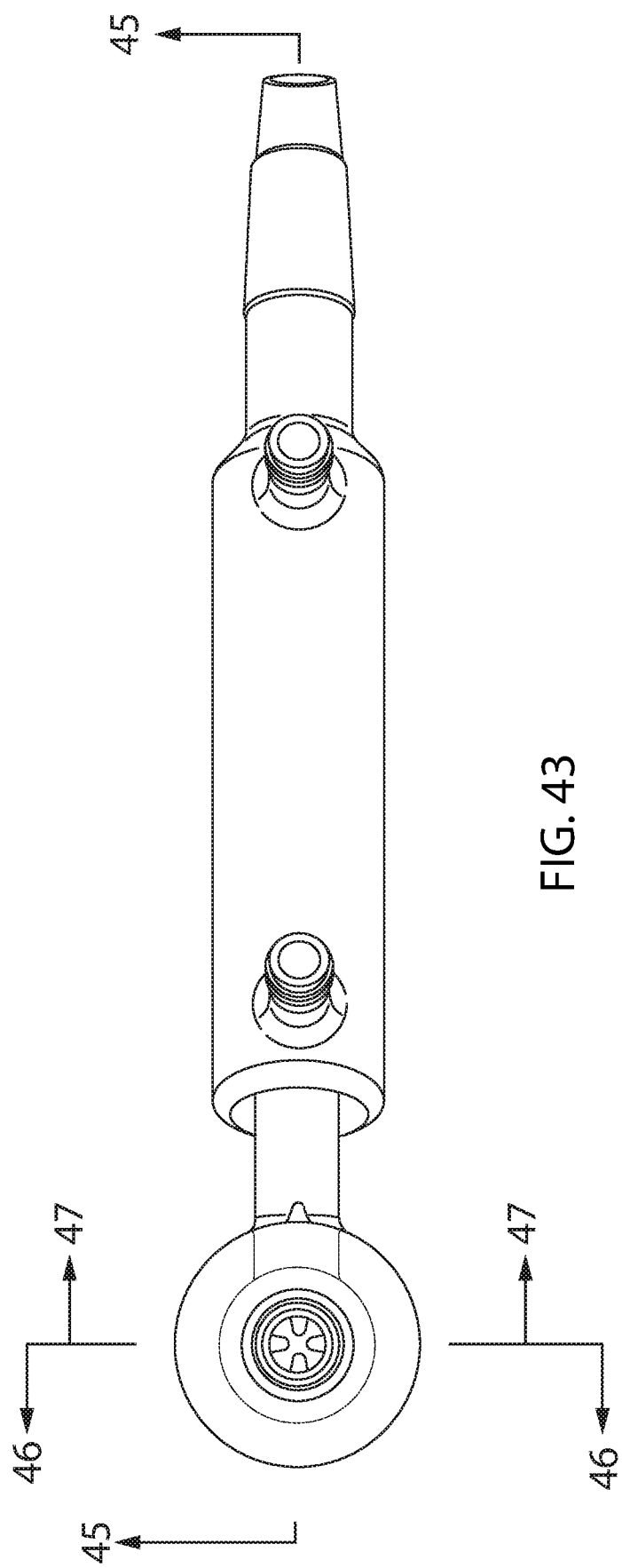
FIG. 43 is a top elevational view of a distillation head according to selected embodiments of the current disclosure.
Figure 44:
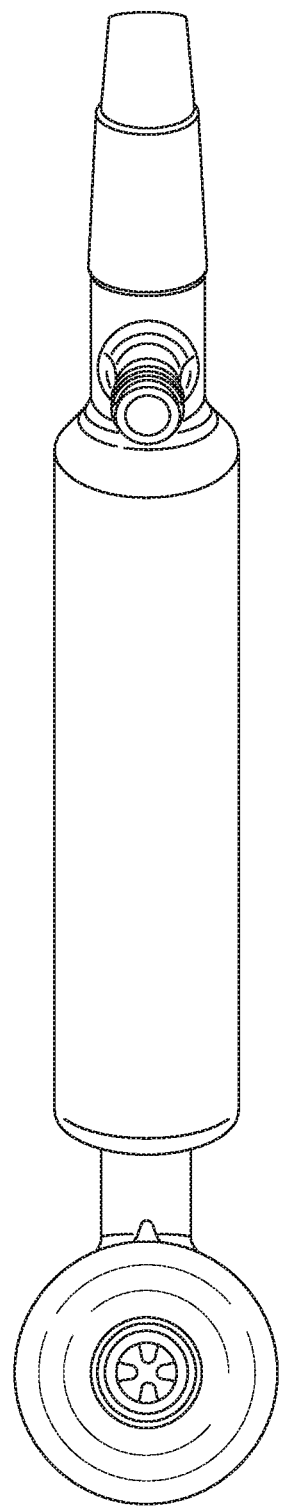
FIG. 44 is a bottom elevational view of a distillation head according to selected embodiments of the current disclosure.

FIGS. 37 and 38 were discussed previously. FIGS. 39 to 40 show an embodiment of the distillation head 10 that shares the features of the embodiment in FIGS. 26 to 36, but omits the inlet port from the back side of the condenser and only has a single inlet port 37 on the top of the device 10. In this embodiment, the wall 30 of the condenser is unbroken and the upper vacuum jacket does not have an inlet port bridging it to the back. The distillation port 35 still bridges the upper jacket to allow distillate to exit from the floor 34 of the condenser. The fractionating column still extends up through the floor 34 of the condenser, and the floor 34 of the condenser still forms the ceiling of the lower jacket. In this embodiment, the lower jacket is silvered. This embodiment also can attach to a secondary condenser 171. FIGS. 40 to 49 are, respectively, left side elevational, front elevational, rear elevational, top elevational, bottom elevational, side cutaway, front cutaway, back cutaway, top cutaway and top cutaway views.

The distillation head and process described herein may be utilized for the distillation of cannabinoids. This distillation head and process may also be used for other high boiling point compounds. The devices, apparatuses, and methods disclosed herein may have particular applicability to fractionate and separate high boiling point compounds, such as cannabinoids, from other constituents found in cannabis oils or other constituents from other herbs. Nonetheless, the devices, apparatuses, and methods disclosed herein may equally apply to the distillation of other compounds.

In particular embodiments of the processes disclosed herein, high boiling point compounds may be distilled under deep vacuum pressure, for example, those below 1 Torr. In some embodiments, distillation using the device may occur at pressures between 0 and 1500 mTorr. Depending on the pressure within the boiling flask, distillation head, and otherwise within the system, the heated temperature may range from ambient to 230° C.

Certain embodiments provide for a distillation head made from borosilicate glass, stainless steel, or a combination thereof, though other materials may be used without departing from the scope of the current disclosure.

While various embodiments of the present disclosure have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present disclosure. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present invention should not be limited by any of the above-described exemplary embodiments.

What is claimed is:

1. A device comprising a distillation head, the distillation head comprising:
    a column with a partially surrounding insulation chamber, the column having an inner diameter and the insulation chamber having a silver lining;
    a condenser, the condenser having an inner diameter and a floor; and
    a distillation port, the distillation port having an inner diameter;
    wherein the column extends through the floor of the condenser, further wherein the floor of the condenser slopes downward towards the distillation port.

2. The distillation head of claim 1, further wherein the inner diameter of the distillation port is substantially equal to or greater than the inner diameter of the column and the inner diameter of the condenser is greater than the inner diameter of the column.

3. The distillation head of claim 2, wherein the insulation chamber around the column is a vacuum chamber.

4. The distillation head of claim 2, wherein the insulation chamber around the condenser is a vacuum chamber.

5. The distillation head of claim 3, wherein the insulation chamber around the condenser is a vacuum insulation chamber.

6. The distillation head of claim 1, wherein the insulation chamber around the condenser is a vacuum chamber.

7. The distillation head of claim 1, further comprising an indent in the column.

8. The distillation head of claim 1, wherein the column further comprising an interior wall, wherein the interior wall is straight at the point where the column passes through the floor of the condenser.

9. The distillation head of claim 1, further comprising an inlet port to the condenser, which inlet port passes through the insulation chamber around the condenser.

10. The distillation head of claim 1, whereby the distillation head is used to separate constituents from herbs.

11. The device of claim 1, further comprising a secondary condenser attached to a joint on the distillation port, the secondary condenser having an electric mantel and an insulated sleeve wrapped around the secondary condenser.

12. A device for distilling compounds, the device comprising:
    a column;
    a lower insulation chamber, the lower insulation chamber further comprising a silver lining;
    a condenser, the condenser having a floor; and
    an exit port;
    wherein the lower insulation chamber at least partially surrounds the column;
    wherein the column extends through the floor of the condenser;
    and further wherein the floor of the condenser slopes downward toward the exit port.

13. The distillation head of claim 12, wherein the insulation chamber around the condenser is a vacuum chamber.

14. A device for distilling liquids, the device comprising:
    a condenser, the condenser having a floor;
    a column having an opening, the column passing through the floor of the condenser and the opening located in the condenser;
    an insulation chamber partially surrounding the column, the insulation chamber having a silver lining;
    an exit port;
    wherein the exit port is a drain for the condenser.

15. The distillation head of claim 14, wherein the insulation chamber around the column is a vacuum chamber.

16. A method of distilling a compound comprising the steps of:
    supplying a vapor from a contained source to a distillation head, where the distillation head comprises:
        a column with a partially surrounding insulation chamber, the column having an inner diameter and the partially surrounding insulation chamber having a silver lining;
        a condenser, the condenser having an inner diameter and a floor; and
        a distillation port, the distillation port having an inner diameter;
        wherein the column extends through the floor of the condenser, the floor of the condenser is configured to drain condensation toward the distillation port; and
    collecting liquid from the distillation port.

17. The method of distilling of claim 16, wherein the insulation chamber around the column is a vacuum chamber.

18. The method of distilling of claim 16, wherein the insulation chamber around the condenser is a vacuum chamber.

19. The method of distilling of claim 17, wherein the insulation chamber around the condenser is a vacuum insulation chamber.

20. The method of distilling of claim 16, wherein the insulation chamber around the column is a vacuum chamber.

21. The method of distilling of claim 16, wherein the vapor is supplied to the distillation head through the column.

22. The method of distilling of claim 16, further comprising the step of maintaining a temperature differential of between about 5° and 30° Celsius between the condenser and the column.

23. The method of distilling of claim 16, wherein the contained source is a boiling flask attached to the distillation head.

* * * * *